US009030391B2

(12) United States Patent
Hong et al.

(10) Patent No.: US 9,030,391 B2
(45) Date of Patent: May 12, 2015

(54) SYSTEMS, DEVICES, AND METHODS FOR DRIVING AN ANALOG INTERFEROMETRIC MODULATOR

(75) Inventors: John H. Hong, San Clemente, CA (US); Chong U. Lee, San Diego, CA (US); Cheonhong Kim, San Diego, CA (US); Edward K. Chan, San Diego, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 335 days.

(21) Appl. No.: 13/308,349

(22) Filed: Nov. 30, 2011

(65) Prior Publication Data

US 2013/0135705 A1 May 30, 2013

(51) Int. Cl.
| | |
|---|---|
| *G09G 3/34* | (2006.01) |
| *G02B 26/00* | (2006.01) |
| *G09G 3/32* | (2006.01) |
| *G02B 26/08* | (2006.01) |
| *G02F 1/157* | (2006.01) |

(52) U.S. Cl.
CPC .............. *G09G 3/3233* (2013.01); *G02B 26/00* (2013.01); *G02B 26/0833* (2013.01); *G02B 26/007* (2013.01); *G09G 2300/0452* (2013.01); *G02F 1/157* (2013.01); *G09G 2300/043* (2013.01); *G09G 3/3258* (2013.01)

(58) Field of Classification Search
CPC ............. G02B 26/0833; G02B 26/007; G09G 3/3233; G09G 2300/0452; G09G 3/3258; G09G 2300/043; G02F 1/157
USPC ............... 345/84, 85, 48, 110, 204, 205, 214, 345/215, 108; 359/223.1, 224.1, 290–295, 359/298
See application file for complete search history.

(56) References Cited

U.S. PATENT DOCUMENTS

| | | | |
|---|---|---|---|
| 4,954,789 | A | 9/1990 | Sampsell |
| 5,784,189 | A | 7/1998 | Bozler et al. |
| 6,040,937 | A | 3/2000 | Miles |
| 6,574,033 | B1 | 6/2003 | Chui et al. |
| 6,674,562 | B1 | 1/2004 | Miles et al. |
| 6,958,850 | B2 | 10/2005 | Sane et al. |
| 6,963,440 | B2 | 11/2005 | Martin et al. |
| 7,042,643 | B2 | 5/2006 | Miles |
| 7,123,216 | B1 | 10/2006 | Miles |
| 7,327,510 | B2 | 2/2008 | Cummings et al. |
| 7,505,194 | B2 | 3/2009 | Bryant |
| 7,560,299 | B2 | 7/2009 | Cummings |
| 7,889,163 | B2 | 2/2011 | Chui et al. |
| 7,990,604 | B2 | 8/2011 | Lee et al. |

(Continued)

OTHER PUBLICATIONS

International Search Report and Written Opinion—PCT/US2012/065558—ISA/EPO—Jan. 1, 2013.

(Continued)

*Primary Examiner* — Evelyn A Lester
(74) *Attorney, Agent, or Firm* — Knobbe, Martens, Olson & Bear LLP

(57) ABSTRACT

This disclosure provides systems, methods and apparatus, including computer programs encoded on computer storage media, for accurately positioning a movable conductive layer of a reflective display element. In one aspect, an initial position of the movable conductive layer with respect to at least one or more fixed conductive layers is sensed. A charging voltage may be determined based at least in part on the initial position. The charging voltage may be applied to the movable conductive layer.

29 Claims, 19 Drawing Sheets

(56) References Cited

U.S. PATENT DOCUMENTS

| | | |
|---|---|---|
| 2004/0240138 A1 | 12/2004 | Martin et al. |
| 2005/0179912 A1 | 8/2005 | Van Brocklin et al. |
| 2006/0245034 A1 | 11/2006 | Chen et al. |
| 2007/0046950 A1 | 3/2007 | Brown et al. |
| 2009/0201242 A1 | 8/2009 | Govil |
| 2009/0224748 A1 | 9/2009 | Mignard et al. |
| 2010/0245313 A1 | 9/2010 | Lewis et al. |
| 2010/0255426 A1 | 10/2010 | Jain et al. |
| 2010/0315696 A1 | 12/2010 | Lee et al. |
| 2013/0135326 A1* | 5/2013 | Govil .......................... 359/290 |

OTHER PUBLICATIONS

Karhade, Feb. 2010, Active control of microinterferometers for low-noise parallel operation, IEEE/ASME Transactions on Mechatronics, 15(1):1-8.

* cited by examiner

SYSTEMS, DEVICES, AND METHODS FOR DRIVING AN ANALOG INTERFEROMETRIC MODULATOR

TECHNICAL FIELD

This disclosure relates to driving schemes and calibration methods for analog interferometric modulators, and for detecting the position of a movable conductor disposed between two conductors of a display element.

DESCRIPTION OF THE RELATED TECHNOLOGY

Electromechanical systems include devices having electrical and mechanical elements, actuators, transducers, sensors, optical components (such as mirrors) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of electromechanical systems device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

SUMMARY

The systems, methods and devices of the disclosure each have several innovative aspects, no single one of which is solely responsible for the desirable attributes disclosed herein.

One innovative aspect of the subject matter described in this disclosure can be implemented in an apparatus for driving a display element, the display element including a movable conductive layer and one or more fixed conductive layers. The apparatus includes a circuit configured to determine an initial position of the movable conductive layer with respect to at least one of the one or more fixed conductive layers, and a controller configured to determine a charging voltage based at least in part on the initial position, and apply the charging voltage to the movable conductive layer.

Another innovative aspect of the subject matter described in this disclosure can be implemented in a method of positioning a movable conductive layer that is movable with respect to one or more fixed conductive layers in a display. The method includes determining an initial position of the movable conductive layer with respect to at least one of the one or more fixed conductive layers, determining a charging voltage based at least in part on the initial position, and applying the charging voltage to the movable conductive layer.

Another innovative aspect of the subject matter described in this disclosure can be implemented in an apparatus for driving a display including a movable conductive layer and one or more fixed conductive layers. The apparatus includes means for determining an initial position of the movable conductive layer with respect to at least one of the one or more fixed conductive layers, means for determining a charging voltage based at least in part on the initial position, and means for applying the charging voltage to the movable conductive layer.

Another innovative aspect of the subject matter described in this disclosure can be implemented in a computer program product for positioning a movable conductive layer that is movable with respect to one or more fixed conductive layers in a display. The computer program product includes a non-transitory computer-readable medium having stored thereon code for causing processing circuitry to determine an initial position of the movable conductive layer with respect to at least one of the one or more fixed conductive layers, determine a charging voltage based at least in part on the initial position, and apply the charging voltage to the movable conductive layer.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1A:
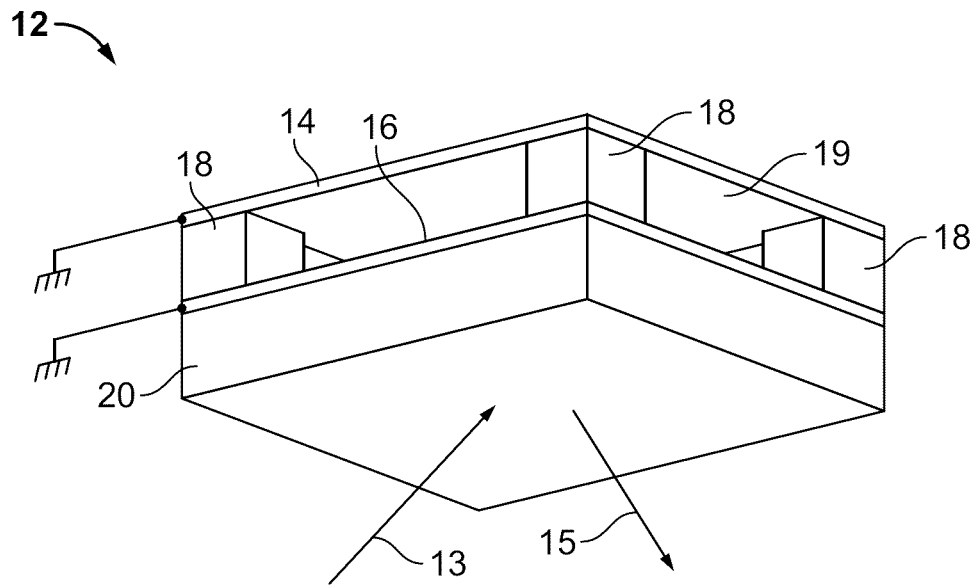
FIGS. 1A and 1B show examples of isometric views depicting a pixel of an interferometric modulator (IMOD) display device in two different states.

The following detailed description is directed to certain implementations for the purposes of describing the innovative aspects. However, the teachings herein can be applied in a multitude of different ways. The described implementations may be implemented in any device that is configured to display an image, whether in motion (such as video) or stationary (such as still image), and whether textual, graphical or pictorial. More particularly, it is contemplated that the implementations may be implemented in or associated with a variety of electronic devices such as, but not limited to, mobile telephones, multimedia Internet enabled cellular telephones, mobile television receivers, wireless devices, smartphones, bluetooth devices, personal data assistants (PDAs), wireless electronic mail receivers, hand-held or portable computers, netbooks, notebooks, smartbooks, printers, copiers, scanners, facsimile devices, GPS receivers/navigators, cameras, MP3 players, camcorders, game consoles, wrist watches, clocks, calculators, television monitors, flat panel displays, electronic reading devices (such as e-readers), computer monitors, auto displays (such as odometer display, etc.), cockpit controls and/or displays, camera view displays (such as display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as MEMS and non-MEMS), aesthetic structures (such as display of images on a piece of jewelry) and a variety of electromechanical systems devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes, and electronic test equipment. Thus, the teachings are not intended to be limited to the implementations depicted solely in the Figures, but instead have wide applicability as will be readily apparent to a person having ordinary skill in the art.

Certain methods and devices described herein relate to implementations of analog interferometric modulators. An analog interferometric modulator may be driven to a range of different positions to generate a variable optical response. The optical response of the analog interferometric modulator is a function of the charge present at a movable electrode, and the corresponding position of the movable electrode relative to the other electrodes of the analog interferometric modulator. Methods and systems for calibrating and controlling the position of an analog interferometric modulator to achieve various optical responses are disclosed.

According to some implementations, methods and systems for controlling the position of movable electrode relative to stationary electrodes of an analog display element are disclosed. Particular implementations of the subject matter described in this disclosure can be implemented to determine an amount of charge to be applied to a movable electrode to reach a desired position. The positional response of a movable electrode depends not only on the voltage being applied, but also the particular electrode position prior to application of the voltage. The disclosed systems and method may include accurate determination of a charge to be applied based at lest in part on the current position of the movable electrode and the final desired position of the movable electrode.

Particular implementations of the subject matter described in this disclosure can be implemented to realize one or more of the following potential advantages. The systems and methods disclosed herein can allow fast and accurate positioning of a movable electrode in an analog interferometric modulator. Further, the systems and methods disclosed herein can increase the ability to produce a high performance array of modulators in a display device even when the physical properties of the modulators of the array include different response characteristics due, for example, to fabrication tolerances. Further, the use of a sequential drive-and-update scheme as will be described according to some implementations below may advantageously be used to drive modulators having a slower response time than modulators than are driven using a continuous feedback driving scheme.

According to some implementations, method and systems for driving an analog display element (such as an IMOD having three or more states) efficiently are disclosed, such that superior brightness and higher color gamut may be achieved relative to a display including binary display elements. Further, a display including analog display elements (such as IMODs) allows each pixel of the display to be configured as any one of red, green, or blue pixels, thereby reducing and/or eliminating the need for sub-pixel arrays for generating different colors. As a result, the spatial resolution of a display including analog display elements (such as IMODs) display can be improved relative to a display having binary display elements. Further, tone scale resolution may also be improved for a display including analog display elements relative to a display having binary display elements.

An example of a suitable MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the interferometric modulator. The reflectance spectrums of IMODs can create fairly broad spectral bands which can be shifted across the visible wavelengths to generate different colors. The position of the spectral band can be adjusted by changing the thickness of the optical resonant cavity, i.e., by changing the position of the reflector.

Figure 1B:
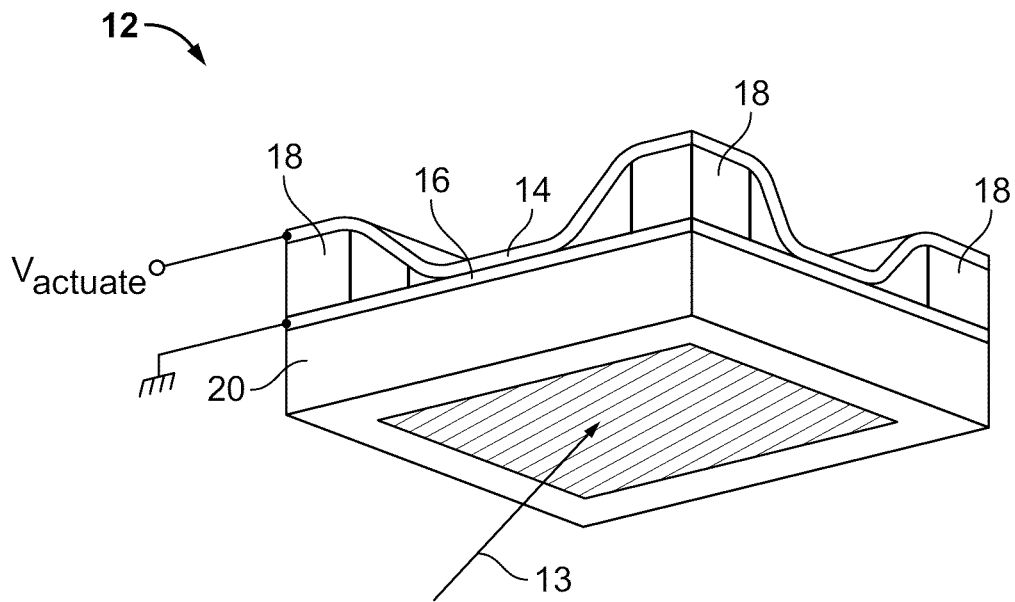

FIGS. 1A and 1B show examples of isometric views depicting a pixel of an interferometric modulator (IMOD) display device in two different states. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, such as to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white. In the example illustrated in FIGS. 1A and 1B, a binary or two-state display element is illustrated. An analog display element (such as a display element having three or more states) will be described in greater below with reference to FIG. 5.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when unactuated, reflecting light outside of the visible range (such as infrared light). In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted pixels in FIGS. 1A and 1B depict two different states of an IMOD 12. In the IMOD 12 in FIG. 1A, a movable reflective layer 14 is illustrated in a relaxed position at a predetermined (such as, designed) distance from an optical stack 16, which includes a partially reflective layer. Since no voltage is applied across the IMOD 12 in FIG. 1A, the movable reflective layer 14 remained in a relaxed or unactuated state. In the IMOD 12 in FIG. 1B, the movable reflective layer 14 is illustrated in an actuated position and adjacent, or nearly adjacent, to the optical stack 16. The voltage $V_{actuate}$ applied across the IMOD 12 in FIG. 1B is sufficient to actuate the movable reflective layer 14 to an actuated position.

In FIGS. 1A and 1B, the reflective properties of pixels 12 are generally illustrated with arrows 13 indicating light incident upon the pixels 12, and light 15 reflecting from the pixel 12 on the left. Although not illustrated in detail, it will be understood by a person having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixels 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, e.g., chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and conductor, while different, more conductive layers or portions (such as of the optical stack 16 or of other structures of the IMOD) can serve to bus signals between IMOD pixels. The optical stack 16 also can include one or more insulating or dielectric layers covering one or more conductive layers or a conductive/absorptive layer.

In some implementations, the optical stack 16, or lower electrode, is grounded at each pixel. In some implementations, this may be accomplished by depositing a continuous optical stack 16 onto the substrate 20 and grounding at least a portion of the continuous optical stack 16 at the periphery of the deposited layers. In some implementations, a highly conductive and reflective material, such as aluminum (Al), may be used for the movable reflective layer 14. The movable reflective layer 14 may be formed as a metal layer or layers deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be on the order of 1-1,000 um, while the gap 19 may be on the order of <10,000 Angstroms (Å).

In some implementations, each pixel of the IMOD, whether in the actuated or relaxed state, is essentially a capacitor formed by the fixed and moving reflective layers. When no voltage is applied, the movable reflective layer 14a remains in a mechanically relaxed state, as illustrated by the pixel 12 in FIG. 1A, with the gap 19 between the movable reflective layer 14 and optical stack 16. However, when a potential difference, such as a voltage, is applied to at least one of the movable reflective layer 14 and optical stack 16, the capacitor formed at the corresponding pixel becomes charged, and electrostatic forces pull the electrodes together.

If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 in FIG. 1B. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

In some implementations, such as in a series or array of IMODs, the optical stacks 16 can serve as a common electrode that provides a common voltage to one side of the IMODs 12. The movable reflective layers 14 may be formed as an array of separate plates arranged in, for example, a matrix form. The separate plates can be supplied with voltage signals for driving the IMODs 12.

Figure 3:
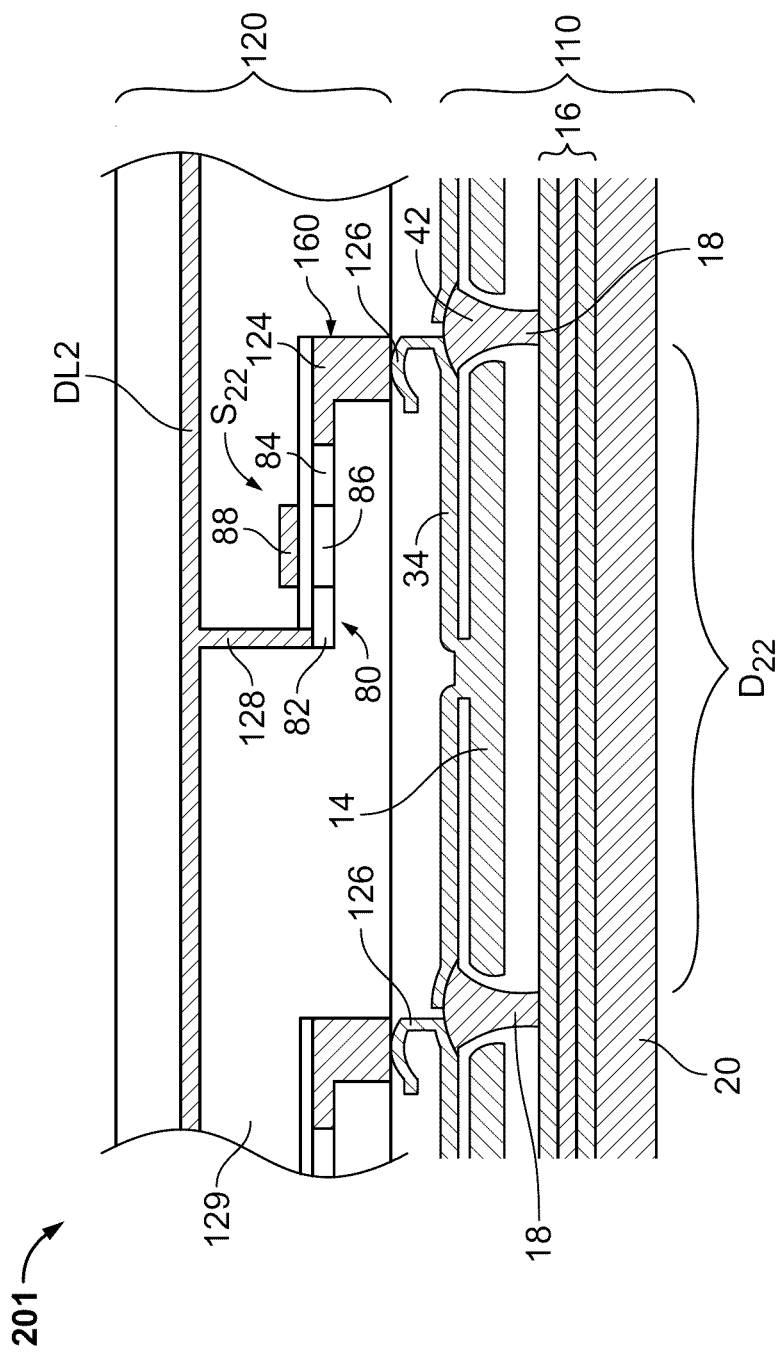
FIG. 3 is an example of a schematic partial cross-section illustrating one implementation of the structure of the driving circuit and the associated display element of FIG. 2.

The details of the structure of interferometric modulators that operate in accordance with the principles set forth above may vary widely. For example, the movable reflective layers 14 of each IMOD 12 may be attached to supports at the corners only, such as on tethers. As shown in FIG. 3, a flat, relatively rigid movable reflective layer 14 may be suspended from a deformable layer 34, which may be formed from a flexible metal. This architecture allows the structural design and materials used for the electromechanical aspects and the optical aspects of the modulator to be selected, and to function, independently of each other. Thus, the structural design and materials used for the movable reflective layer 14 can be optimized with respect to the optical properties, and the structural design and materials used for the deformable layer 34 can be optimized with respect to desired mechanical properties. For example, the movable reflective layer 14 portion may be aluminum, and the deformable layer 34 portion may be nickel. The deformable layer 34 may connect, directly or indirectly, to the substrate 20 around the perimeter of the deformable layer 34. These connections may form the support posts 18.

In implementations such as those shown in FIGS. 1A and 1B, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 3) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing.

Figure 2:
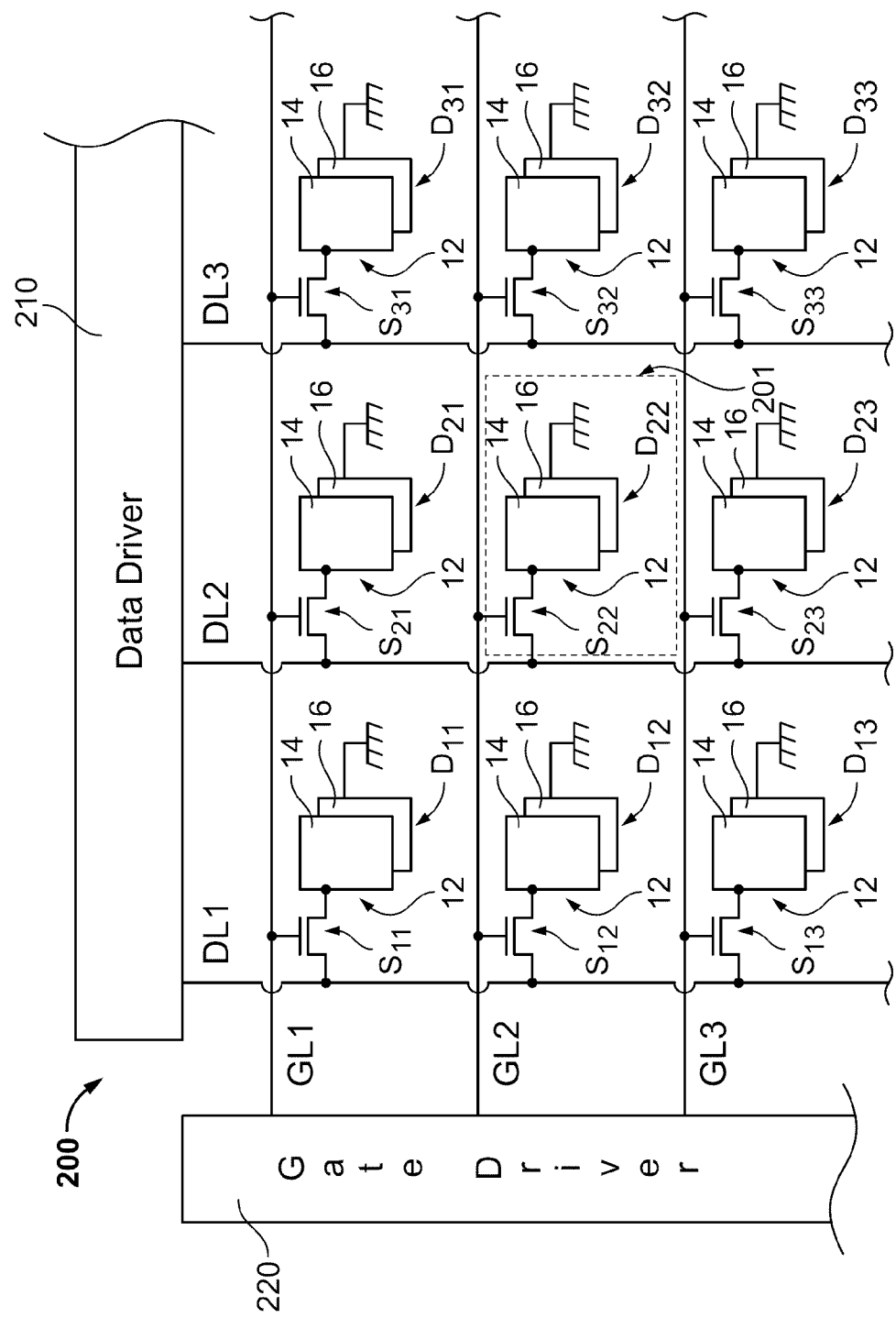
FIG. 2 shows an example of a schematic circuit diagram illustrating a driving circuit array for an optical MEMS display device.

FIG. 2 shows an example of a schematic circuit diagram illustrating a driving circuit array 200 for an optical MEMS display device. The driving circuit array 200 can be used for implementing an active matrix addressing scheme for providing image data to display elements $D_{11}$-$D_{mn}$ of a display array assembly.

The driving circuit array 200 includes a data driver 210, a gate driver 220, first to m-th data lines DL1-DLm, first to n-th gate lines GL1-GLn, and an array of switches or switching circuits $S_{11}$-$S_{mn}$. Each of the data lines DL1-DLm extends from the data driver 210, and is electrically connected to a respective column of switches $S_{11}$-$S_{1n}$, $S_{21}$-$S_{2n}$, $S_{m1}$-$S_{mn}$. Each of the gate lines GL1-GLn extends from the gate driver 220, and is electrically connected to a respective row of switches $S_{11}$-$S_{m1}$, $S_{12}$-$S_{m2}$, $S_{1n}$-$S_{mn}$. The switches $S_{11}$-$S_{mn}$ are electrically coupled between one of the data lines DL1-DLm and a respective one of the display elements $D_{11}$-$D_{mn}$ and receive a switching control signal from the gate driver 220 via one of the gate lines GL1-GLn. The switches $S_{11}$-$S_{mn}$ are illustrated as single FET transistors, but may take a variety of forms such as two transistor transmission gates (for current flow in both directions) or even mechanical MEMS switches.

The data driver 210 can receive image data from outside the display, and can provide the image data on a row by row basis in a form of voltage signals to the switches $S_{11}$-$S_{mn}$ via the data lines DL1-DLm. The gate driver 220 can select a particular row of display elements $D_{11}$-$D_{m1}$, $D_{12}$-$D_{m2}$, ..., $D_{1n}$-$D_{mn}$ by turning on the switches $S_{11}$-$S_{m1}$, $S_{12}$-$S_{m2}$, ..., $S_{1n}$-$S_{mn}$ associated with the selected row of display elements $D_{11}$-$D_{m1}$, $D_{12}$-$D_{m2}$, ..., $D_{1n}$-$D_{mn}$. When the switches $S_{11}$-$S_{m1}$, $S_{12}$-$S_{m2}$, ..., $S_{1n}$-$S_{mn}$ in the selected row are turned on, the image data from the data driver 210 is passed to the selected row of display elements $D_{11}$-$D_{m1}$, $D_{12}$-$D_{m2}$, ..., $D_{1n}$-$D_{mn}$.

During operation, the gate driver 220 can provide a voltage signal via one of the gate lines GL1-GLn to the gates of the switches $S_{11}$-$S_{mn}$ in a selected row, thereby turning on the switches $S_{11}$-$S_{mn}$. After the data driver 210 provides image data to all of the data lines DL1-DLm, the switches $S_{11}S_{mn}$ of the selected row can be turned on to provide the image data to the selected row of display elements $D_{11}$-$D_{m1}$, $D_{12}$-$D_{m2}$, ..., $D_{1n}$-$D_{mn}$, thereby displaying a portion of an image. For example, data lines DL that are associated with pixels that are to be actuated in the row can be set to, a voltage, such as 10-volts (could be positive or negative), and data lines DL that are associated with pixels that are to be released in the row can be set to, a voltage, such as 0-volts. Then, the gate line GL for the given row is asserted, turning the switches in that row on, and applying the selected data line voltage to each pixel of that row. This charges and actuates the pixels that have 10-volts applied, and discharges and releases the pixels that have 0-volts applied. Then, the switches $S_{11}$-$S_{mn}$ can be turned off. The display elements $D_{11}$-$D_{m1}$, $D_{12}$-$D_{m2}$, ..., $D_{1}$-$D_{mn}$ can hold the image data because the charge on the actuated pixels will be retained when the switches are off, except for some leakage through insulators and the off state switch. Generally, this leakage is low enough to retain the image data on the pixels until another set of data is written to the row. These steps can be repeated to each succeeding row until all of the rows have been selected and image data has been provided thereto. In the implementation of FIG. 2, the optical stack 16 is grounded at each pixel. In some implementations, this may be accomplished by depositing a continuous optical stack 16 onto the substrate and grounding the entire sheet at the periphery of the deposited layers.

FIG. 3 is an example of a schematic partial cross-section illustrating one implementation of the structure of the driving circuit and the associated display element of FIG. 2. A portion 201 of the driving circuit array 200 includes the switch $S_{22}$ at the second column and the second row, and the associated display element $D_{22}$. In the illustrated implementation, the switch $S_{22}$ includes a transistor 80. Other switches in the driving circuit array 200 can have the same configuration as the switch $S_{22}$, or can be configured differently, for example by changing the structure, the polarity, or the material.

FIG. 3 also includes a portion of a display array assembly 110, and a portion of a backplate 120. The portion of the display array assembly 110 includes the display element $D_{22}$ of FIG. 2. The display element $D_{22}$ includes a portion of a front substrate 20, a portion of an optical stack 16 formed on the front substrate 20, supports 18 formed on the optical stack 16, a movable reflective layer 14 (or a movable electrode connected to a deformable layer 34) supported by the supports 18, and an interconnect 126 electrically connecting the movable reflective layer 14 to one or more components of the backplate 120.

The portion of the backplate 120 includes the second data line DL2 and the switch $S_{22}$ of FIG. 2, which are embedded in the backplate 120. The portion of the backplate 120 also includes a first interconnect 128 and a second interconnect 124 at least partially embedded therein. The second data line DL2 extends substantially horizontally through the backplate 120. The switch $S_{22}$ includes a transistor 80 that has a source 82, a drain 84, a channel 86 between the source 82 and the drain 84, and a gate 88 overlying the channel 86. The transistor 80 can be, e.g., a thin film transistor (TFT) or metal-oxide-semiconductor field effect transistor (MOSFET). The gate of the transistor 80 can be formed by gate line GL2 extending through the backplate 120 perpendicular to data line DL2. The first interconnect 128 electrically couples the second data line DL2 to the source 82 of the transistor 80.

The transistor 80 is coupled to the display element $D_{22}$ through one or more vias 160 through the backplate 120. The vias 160 are filled with conductive material to provide electrical connection between components (for example, the display element $D_{22}$) of the display array assembly 110 and components of the backplate 120. In the illustrated implementation, the second interconnect 124 is formed through the via 160, and electrically couples the drain 84 of the transistor 80 to the display array assembly 110. The backplate 120 also can include one or more insulating layers 129 that electrically insulate the foregoing components of the driving circuit array 200.

The optical stack 16 of FIG. 3 is illustrated as three layers, a top dielectric layer described above, a middle partially reflective layer (such as chromium) also described above, and a lower layer including a transparent conductor (such as indium-tin-oxide (ITO)). The common electrode is formed by the ITO layer and can be coupled to ground at the periphery of the display. In some implementations, the optical stack 16 can include more or fewer layers. For example, in some implementations, the optical stack 16 can include one or more insulating or dielectric layers covering one or more conductive layers or a combined conductive/absorptive layer.

Figure 4:
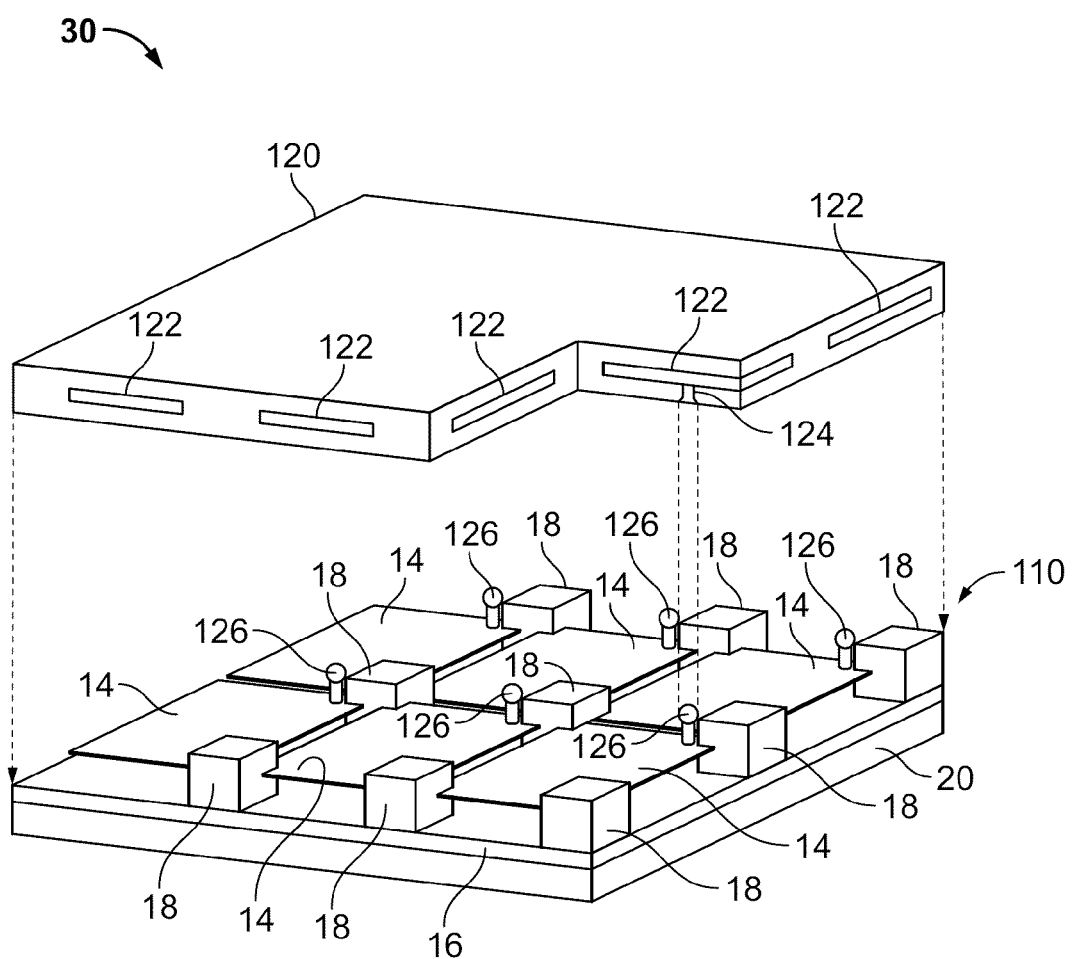
FIG. 4 is an example of a schematic exploded partial perspective view of an optical MEMS display device having an interferometric modulator array and a backplate with embedded circuitry.

FIG. 4 is an example of a schematic exploded partial perspective view of an optical MEMS display device 30 having an interferometric modulator array and a backplate with embedded circuitry. The display device 30 includes a display array assembly 110 and a backplate 120. In some implementations, the display array assembly 110 and the backplate 120 can be separately pre-formed before being attached together. In some other implementations, the display device 30 can be fabricated in any suitable manner, such as, by forming components of the backplate 120 over the display array assembly 110 by deposition.

The display array assembly 110 can include a front substrate 20, an optical stack 16, supports 18, a movable reflective layer 14, and interconnects 126. The backplate 120 can include backplate components 122 at least partially embedded therein, and one or more backplate interconnects 124.

The optical stack 16 of the display array assembly 110 can be a substantially continuous layer covering at least the array region of the front substrate 20. The optical stack 16 can include a substantially transparent conductive layer that is electrically connected to ground. The reflective layers 14 can be separate from one another and can have, a shape, such as, a square or rectangular shape. The movable reflective layers 14 can be arranged in a matrix form such that each of the movable reflective layers 14 can form part of a display element. In the implementation illustrated in FIG. 4, the movable reflective layers 14 are supported by the supports 18 at four corners.

Each of the interconnects 126 of the display array assembly 110 serves to electrically couple a respective one of the movable reflective layers 14 to one or more backplate components 122 (such as transistors S and/or other circuit elements). In the illustrated implementation, the interconnects 126 of the display array assembly 110 extend from the movable reflective layers 14, and are positioned to contact the backplate interconnects 124. In another implementation, the interconnects 126 of the display array assembly 110 can be at least partially embedded in the supports 18 while being exposed through top surfaces of the supports 18. In such an implementation, the backplate interconnects 124 can be positioned to contact exposed portions of the interconnects 126 of the display array assembly 110. In yet another implementation, the backplate interconnects 124 can extend from the backplate 120 toward the movable reflective layers 14 so as to contact and thereby electrically connect to the movable reflective layers 14.

The interferometric modulators described above have been described as bi-stable elements having a relaxed state and an actuated state. The above and following description, however, also may be used with analog interferometric modulators having a range of states. For example, an analog interferometric modulator can have a red state, a green state, a blue state, a black state and a white state, in addition to other color states. In some implementations, a display element (such as an analog IMOD illustrated in FIG. 5 described further below) has 3, 4, 7, 8, 15, 16, 31, 32, 63, 64, 127, 128, 255, or 256 states. In some implementations, the states may not be quantized, and an essentially continuously variable state may be achieved. Accordingly, a single interferometric modulator can be configured to have various states with different light reflectance properties over a wide range of the optical spectrum.

Figure 5:
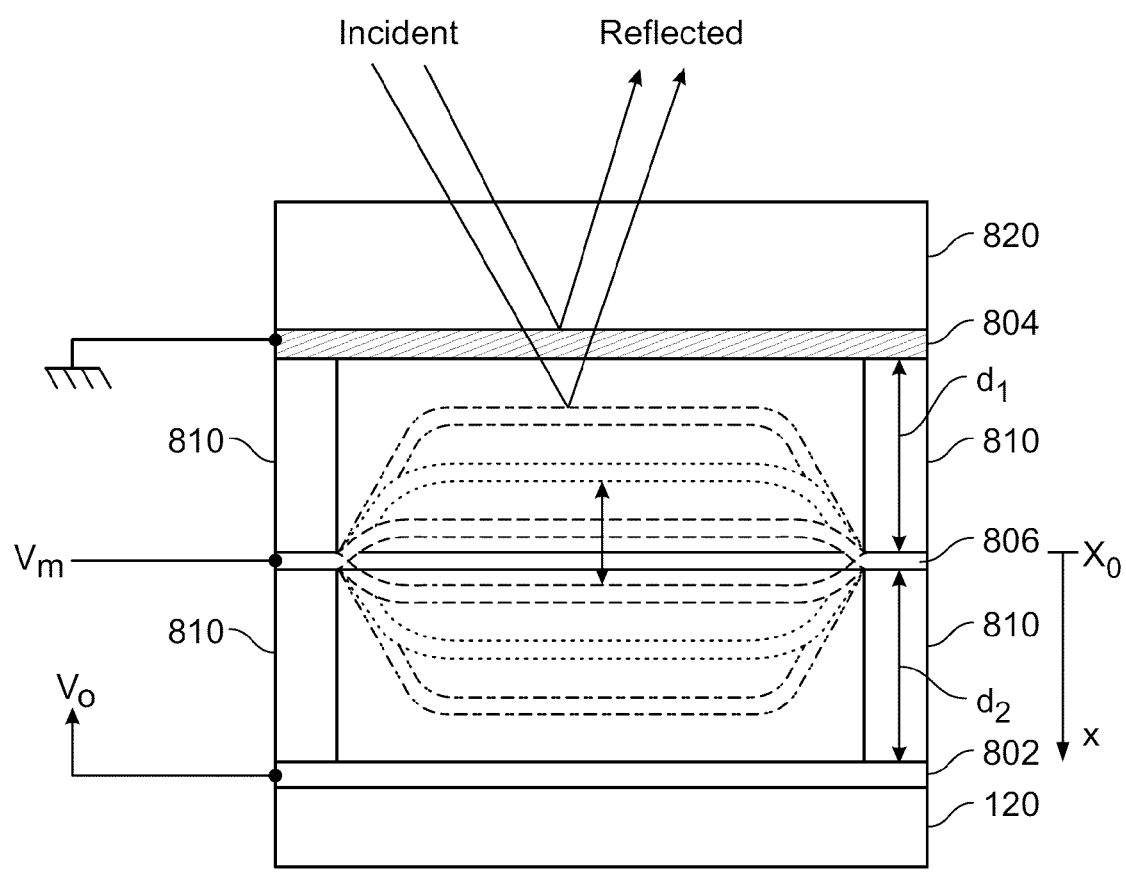
FIG. 5 is a cross-section of an implementation of an interferometric modulator having two fixed layers and a movable third layer.

FIG. 5 is a cross-section of an implementation of an interferometric modulator having two fixed layers and a movable third layer. As illustrated, the interferometric modulator of FIG. 5 is illustrated to be viewed from the side of a substrate 820. FIG. 5 shows an implementation of an analog interferometric modulator having a fixed first layer 802, a fixed second layer 804, and a movable third layer 806 positioned between the fixed first and second layers 802 and 804. Each of the layers 802, 804, and 806 may include an electrode or other conductive material. For example, the fixed first layer 802 may include a layer made of metal. The fixed first layer 802 and fixed second layer 804 may be referred to herein as fixed conductive layers, while the movable third layer 806 may be referred to herein as a movable conductive layer. Each of the layers 802, 804, and 806 may be stiffened using a stiffening layer formed on or deposited on the respective layer. In one implementation, the stiffening layer includes a dielectric. The stiffening layer may be used to keep the layer to which it is attached rigid and substantially flat. Some implementations of the interferometric modulator may be referred to as a three-terminal interferometric modulator.

Certain of the implementations described herein may be implemented by omitting one of the electrodes (such as fixed first layer 802 or fixed second layer 804). In these implementations, a voltage $V_m$ may be applied to a movable layer that has a variable position relative to a single layer coupled to ground. In this way, an analog modulator having two terminals rather than three can be formed, and the methods described herein may be applied to such two-terminal modulators.

The three layers 802, 804, and 806 are electrically insulated by insulating posts 810. The movable third layer 806 is suspended from the insulating posts 810. The movable third layer 806 is configured to deform such that the movable third layer 806 may be displaced towards the substrate 820, and as illustrated in FIG. 5, toward the fixed first layer 802, or may be displaced in away from the substrate 820, and as illustrated in FIG. 5, toward the fixed second layer 804. In some implementations, the fixed first layer 802 may also refer to the electrode layer closer to the substrate 820, while the fixed second layer 804 may refer to the electrode layer farther from the substrate 820

In FIG. 5, the movable third layer 806 is illustrated as being in an equilibrium position with the solid lines. As illustrated, $d_1$ corresponds to the nominal distance between the fixed second layer 804 and the movable third layer 806, while $d_2$ corresponds to the nominal distance between the fixed first layer 802 and the movable third layer 806. The position of the movable third layer 806 from the middle position between the fixed first layer 802 and fixed second layer 806 (such as the position at which $d_1=d_2$) may be indicated by a value x as illustrated in FIG. 5, where a positive value of x corresponds to a position closer to the fixed first layer 802 and a negative value of x corresponds to a distance that is farther from the fixed first layer 802. When positioned at a substantial midpoint (such as the position at which $d_1=d_2$) between the fixed first layer 802 and the fixed second layer 804, the position of the movable third layer 806 may correspond to a nominal position $X_0$.

As illustrated in FIG. 5, a fixed voltage difference may be applied between the fixed first layer 802 and the fixed second layer 804. In the implementation of FIG. 5, a voltage $V_0$ is applied to fixed first layer 802 while fixed second layer 804 is grounded. A person/one having ordinary skill in the art will recognize that the alternative arrangement is also possible (such as when a voltage $V_0$ is applied to the fixed second layer 804 and the fixed first layer 802 is grounded). If a variable voltage $V_m$ is applied to the movable third layer 806, then as that voltage $V_m$ approaches $V_0$, the movable third layer 806 will be electrostatically pulled toward fixed second layer 804. As that voltage $V_m$ approaches ground, the movable third layer 806 will be electrostatically pulled toward fixed first layer 802. Ideally, if a voltage at the midpoint of these two voltages ($V_0/2$ in this implementation) is applied to movable third layer 806, then the movable third layer 806 will be maintained in its equilibrium position indicated with solid lines in FIG. 5. By applying a variable voltage to the movable third layer 806 that is between the voltages on fixed first and second layers 802 and 804, the movable third layer 806 can be positioned at a desired location between fixed first and second layers 802 and 804, producing a desired optical response. This desired position may be referred herein as a desired position or final position $x_F$. As illustrated in FIG. 5, the position of movable third layer 806 relative to the fixed first layer 802 and fixed second layer 804 corresponds to plural states for the display element 800 such that each state has a different optical response.

The voltage difference $V_0$ between the fixed first and second layers 802 and 804 can vary widely depending on the materials and construction of the device, and in many implementations may be in the range of about 5-20 volts. As the movable third layer 806 moves away from the equilibrium position ($X_0$), it will deform or bend. In such deformed or bent configuration, an elastic spring force mechanically biases the movable third layer 806 toward the equilibrium position. This mechanical force (which may be referred to as a spring stiffness K) also contributes to the final position of the movable third layer 806 when a voltage $V_m$ is applied thereto.

The movable third layer 806 may include a mirror to reflect light entering the interferometric modulator through substrate 820. The mirror may include a metal material. The fixed second layer 804 may include a partially absorbing material such that the fixed second layer 804 acts as an absorbing layer. This absorbing material may be as described above with reference to the optical stack 16 illustrated in FIG. 1. When light reflected from the movable third layer 806 is viewed from the side of the substrate 820 opposing movable third layer 806, the viewer may perceive the reflected light as a certain color. By adjusting the position of the movable third layer 806, certain wavelengths of light may be selectively reflected.

Figure 6:
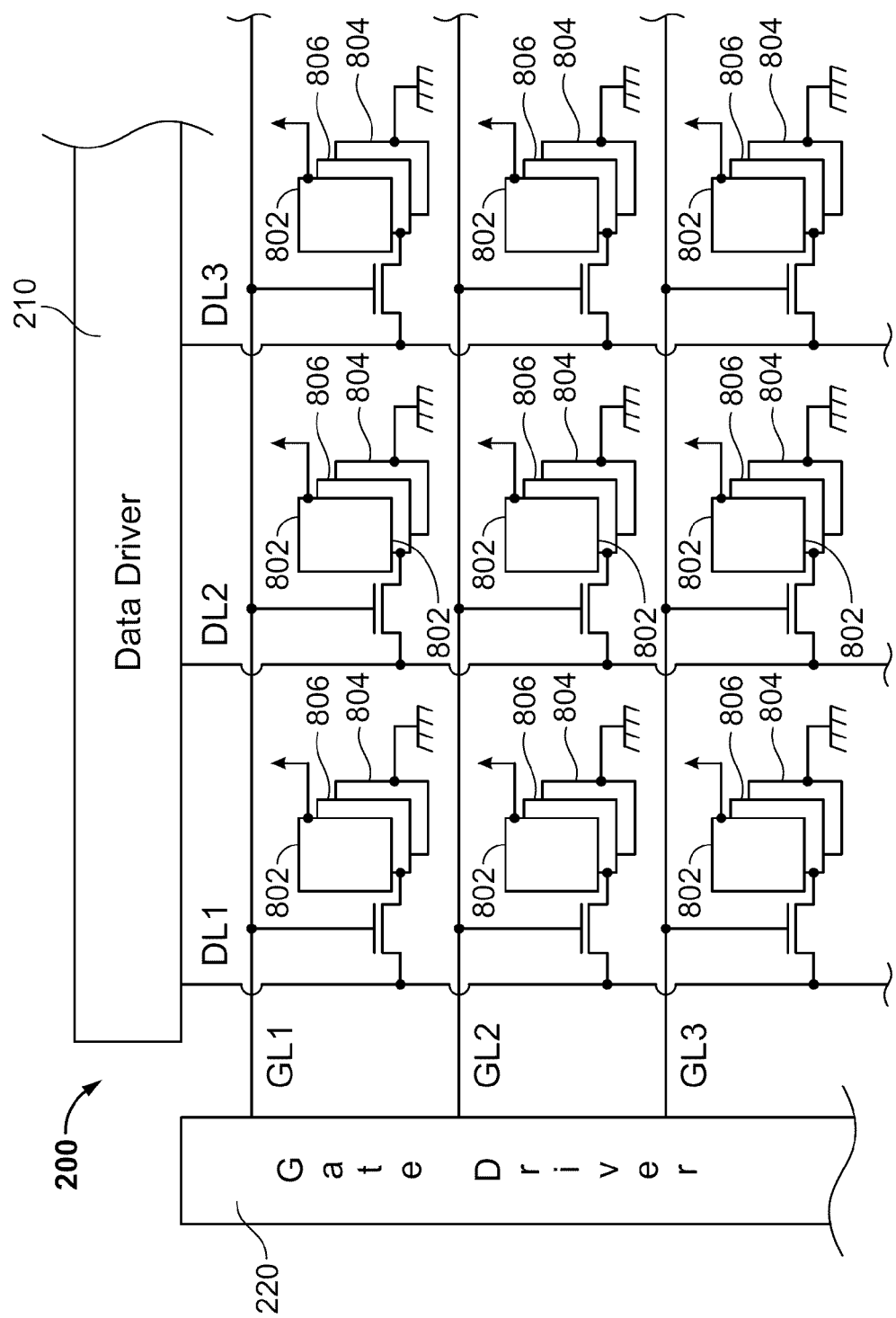
FIG. 6 shows an example of a schematic circuit diagram illustrating a driving circuit array for a display device having the structure of FIG. 5.

FIG. 6 shows an example of a schematic circuit diagram illustrating a driving circuit array for a display device having the structure of FIG. 5. The overall apparatus shares many similarities to the structure of FIG. 2 that uses the bi-stable interferometric modulators. As shown in FIG. 6, however, an additional layer, corresponding to fixed first layer 802 is provided for each display element. The fixed first layer 802 may be deposited on the inside surface of the backplate 120 facing the movable layer shown in FIGS. 3 and 4, and may have a voltage $V_0$ applied thereto as described with reference to FIG. 5. The data driver 210 and gate driver 220 of FIG. 6 can be used in a manner similar to that described above with reference to FIG. 2, except the voltages provided on the data lines DL1-DLn can be placed at a range of voltages between $V_0$ and ground, rather than at one of only two different voltages. In this way, the movable third layers 806 of the display elements along a row can each be independently placed in any particular desired position between the fixed first layer 802 and the fixed second layer 804 when the row is written by asserting the gate line for that particular row.

Figure 7:
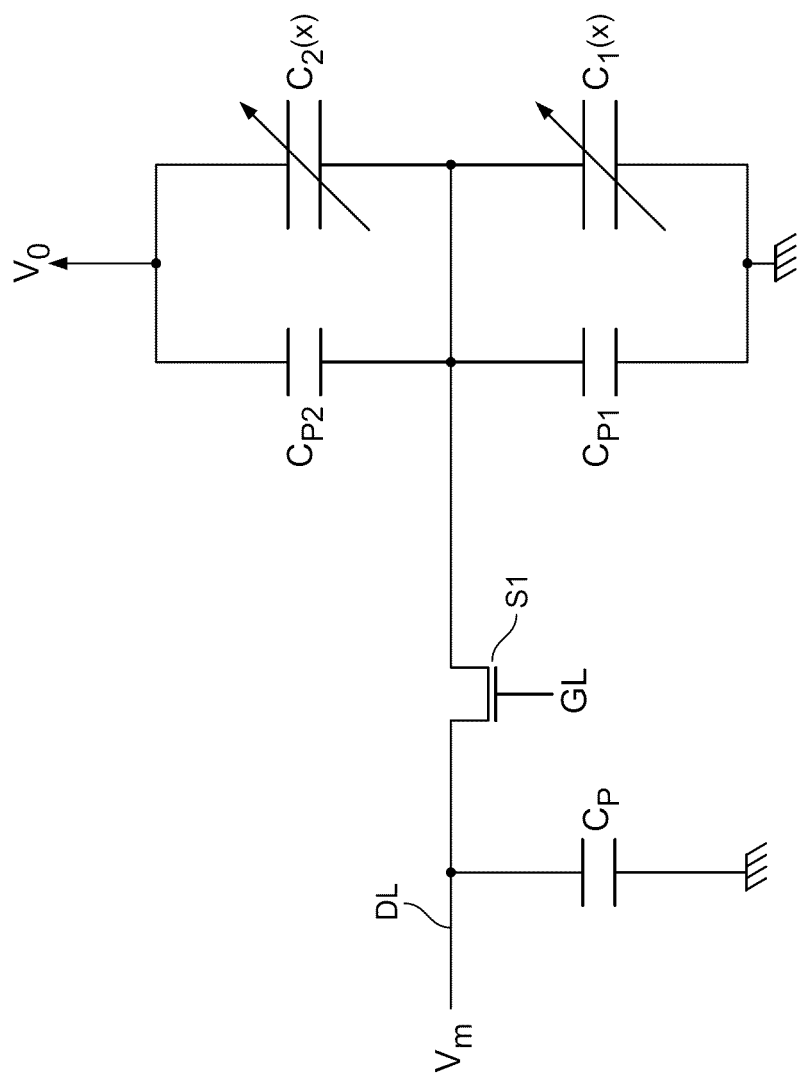
FIG. 7 is a schematic representation of the interferometric modulator and voltage sources illustrated in FIG. 5.

FIG. 7 is a schematic representation of the interferometric modulator and voltage sources illustrated in FIG. 5. In this schematic, the modulator is coupled to the voltage sources $V_0$ and $V_m$. The equivalent circuit model of the interferrometric modulator and voltage sources is shown in FIG. 7. Each interferometric modulator pixel is selectively connected to a data line (such as DL1-DLn) by a switch S1. Each data line may include an associated parasitic capacitance, illustrated as capacitance $C_P$. As illustrated, each interferometric modulator also includes associated parasitic capacitances $C_{P1}$ and $C_{P2}$, which are typically small. The gap between the fixed first layer 802 and the movable third layer 806 may correspond to a variable capacitance $C_2(x)$, while the gap between the movable third layer 806 and the fixed second layer 804 may correspond to a variable capacitance $C_1(x)$. The capacitance values $C_1(x)$ and $C_2(x)$ are each a function of the position (x) of the movable third layer 806. Thus, in the schematic representation illustrated in FIG. 7, the voltage source $V_0$ is connected across the coupled capacitors $C_{P1}$, $C_{P2}$, $C_1(x)$, and $C_2(x)$ while the voltage source $V_m$ is connected to the middle layer 806 between the parallel coupled capacitors $C_{P1}$, $C_1(x)$, and the parallel coupled capacitors $C_{P2}$, $C_2(x)$.

Accurately driving the movable third layer 806 to different positions using the voltage sources $V_0$ and $V_m$ as described above, however, may be difficult with many configurations of the interferometric modulator because the relationship between voltage applied to the modulator and the position of the movable third layer 806 may be highly non-linear. Further, applying the same voltage $V_m$ to the movable third layers 806 of different interferometric modulators may not cause the respective movable third layers 806 to move to the same position relative to the fixed first layer 802 and fixed second layer 804 of each modulator due to manufacturing differences, for example, variations in thickness or elasticity of the movable third layers 806 over the entire display surface. As the position of the movable third layer 806 will determine what color is reflected from the interferometric modulator, as discussed above, accurately driving the movable third layer 806 to desired positions allows more accurate control of a displayed image. In many implementations described in more detail below, through operation of the switch $S_1$, an isolated charge ($Q_m$) may be applied to the movable third layer 806 in order to move the movable third layer 806 to the desired position.

During operation of a display in accordance with some implementations, a given pixel may be placed at a series of desired positions in accordance with a series of frames of image data by successively placing and isolating a series of isolated charges Q on the pixel in accordance with the corresponding series of desired positions. The magnitude of the displacement from central undeflected position $X_0$ will be denoted herein by the variable "x". Initial and final values for this variable x may be referred to as $x_0$ and $x_1$ respectively. As described in additional detail below, the position of the display element may be adjusted by determining the desired charge $Q_m$ required for placing the layer 806 at new desired position $x_1$. Then, the voltage necessary to place this charge on the middle layer 806 when the layer 806 is in its current position $x_0$ is determined (the initial position $x_0$ may, and often will, be different from the no displacement central position $X_0$ described above with reference to FIG. 5). This voltage is applied to the middle layer when it is in position $x_0$, the new charge state is then isolated on the middle layer 806, and the middle layer 806 then moves to the new position $x_1$. Since the mechanical response of the movable third layer 806 to an applied voltage may be slow relative to the time necessary to place a desired charge on the third layer 806, during the very short time interval when the switch 51 is closed, the mirror position may not change significantly.

The amount of charge to place on the mirror 806 may be based on modeling the response of the interferrometric modulator which will be described in greater detail with reference to Equation 1 below. The steady state position of the mirror may be described by Equation 1 which balances electrostatic forces on the mirror 806 with a restoring spring force:

$$\frac{Q_m^2}{2\varepsilon_0 A_P}\left(\frac{d_1 - d_2 + 2x}{d_1 + d_2}\right) - \frac{Q_m V_0}{d_1 + d_2} - K(x - \Delta x_L) = 0 \quad (1)$$

In this formula, K is the spring stiffness value, $A_P$ is the area of the movable third layer 806 (such as the mirror) electrode, $V_0$ is the static bias applied between the fixed first layer 802 and the fixed second layer 804, $Q_m$ is the isolated charge on the movable third layer 806, $d_1$ corresponds to the distance between the fixed second layer 804 and the movable third layer 806 under no deformation from its nominal position, $d_2$ corresponds to the distance between the fixed first layer 802 and the movable third layer 806 under no deformation from its nominal position, $\varepsilon_0$ is the permittivity constant, and $\Delta x_L$, is the "launch condition" of the movable third layer 806. The launch condition of the movable third layer 806 as referred to herein corresponds to position where the movable third layer 806 rests when there is no electrostatic force acting on it (for example, when all three layers 802, 804, and 806 are at the same potential), due to, for example, fabrication induced mechanical bias, or the like.

Solving Equation 1 above for the charge $Q_m$ as a function of x results in Equation 2 below:

$$Q_m(x) = \frac{\varepsilon_0 A_P V_0}{d_1 - d_2 + 2x}\left\{1 - \sqrt{1 + \frac{2K}{\varepsilon_0 A_P V_0^2}(d_1 + d_2)(d_1 - d_2 + 2x)(x - \Delta x_L)}\right\} \quad (2)$$

Expansion of the square root by Taylor's series shows that the leading term is linear with the position x and varies inversely with $(V_0(d_1 + d_2))$ as represented in Equation 3 below.

$$Q_m(x) = \frac{\varepsilon_0 A_P V_0}{d_1 - d_2 + 2x} \quad (3)$$

$$\left\{1 - \left(1 + \frac{K}{\varepsilon_0 A_P V_0^2}(d_1 + d_2)(d_1 - d_2 + 2x)(x - \Delta x_L) + \ldots\right)\right\} \approx$$

$$\frac{-K(x - \Delta x_L)(d_1 + d_2)}{V_0} + \ldots$$

The negative value in this formula is due to the choice of geometry. For example, in FIG. 5 above, a positive voltage on the fixed first layer 802 sets up an electric field that is directed in the negative x direction.

The value of the voltage $V_m$ needed to produce a net charge of $Q_m$ on the mirror when the mirror is at the position $x=x_0$ is given by Equation 4 below:

$$V_m = \frac{(C_2(x_0) + C_{P2})V_0}{C_1(x_0) + C_2(x_0) + C_{P1} + C_{P2}} + \left(\frac{1}{C_1(x_0) + C_2(x_0)}\right)Q_m \quad (4)$$

where $Q_m$ is the charge needed to move the mirror to a desired position $x_1$ so that the voltage needed to do the same is a function of two position variables, the current position $x_0$ and the next position $x_1$. The values of the variable capacitance associated with the movable third layer 806 are given by Equation 5:

$$C_1(x_0) = \frac{\varepsilon_0 A_P}{d_1 + x_0}, \quad (5)$$

$$C_2(x_0) = \frac{\varepsilon_0 A_P}{d_2 - x_0}$$

After the movable third layer 806 is charged, the movable third layer 806 moves and settles at the new position $x_1$, at which point the voltage on the movable third layer is given by Equation 6:

$$V_C(\infty) = \frac{(C_2(x_1) + C_{P2})V_0}{C_1(x_1) + C_2(x_1) + C_{P1} + C_{P2}} + \left(\frac{1}{C_1(x_1) + C_2(x_1)}\right)Q_m \quad (6)$$

In some implementations, a data driver (e.g. data driver 210 of FIG. 6) is configured to determine the initial position of a pixel and a final desired position of the pixel. From this information, a charge to be placed on the pixel is calculated, and a voltage to be applied to the middle layer to obtain this charge is calculated. These computations may be done using formulas (3), (4), and (5) above. This voltage is then output on the appropriate data line. The appropriate gate line is asserted for a time period long enough to charge the middle layer, but short enough that the middle layer does not change position significantly during the charging process. For example, in some implementations, the appropriate gate line may be asserted from a time period of about 1 μs to about 10 μs, while the response time of the middle layer to application of a voltage may correspond to a period of about 50 μs to about 100 μs. Upon application of the charging voltage, the middle layer will then move to its final position.

Figure 8:
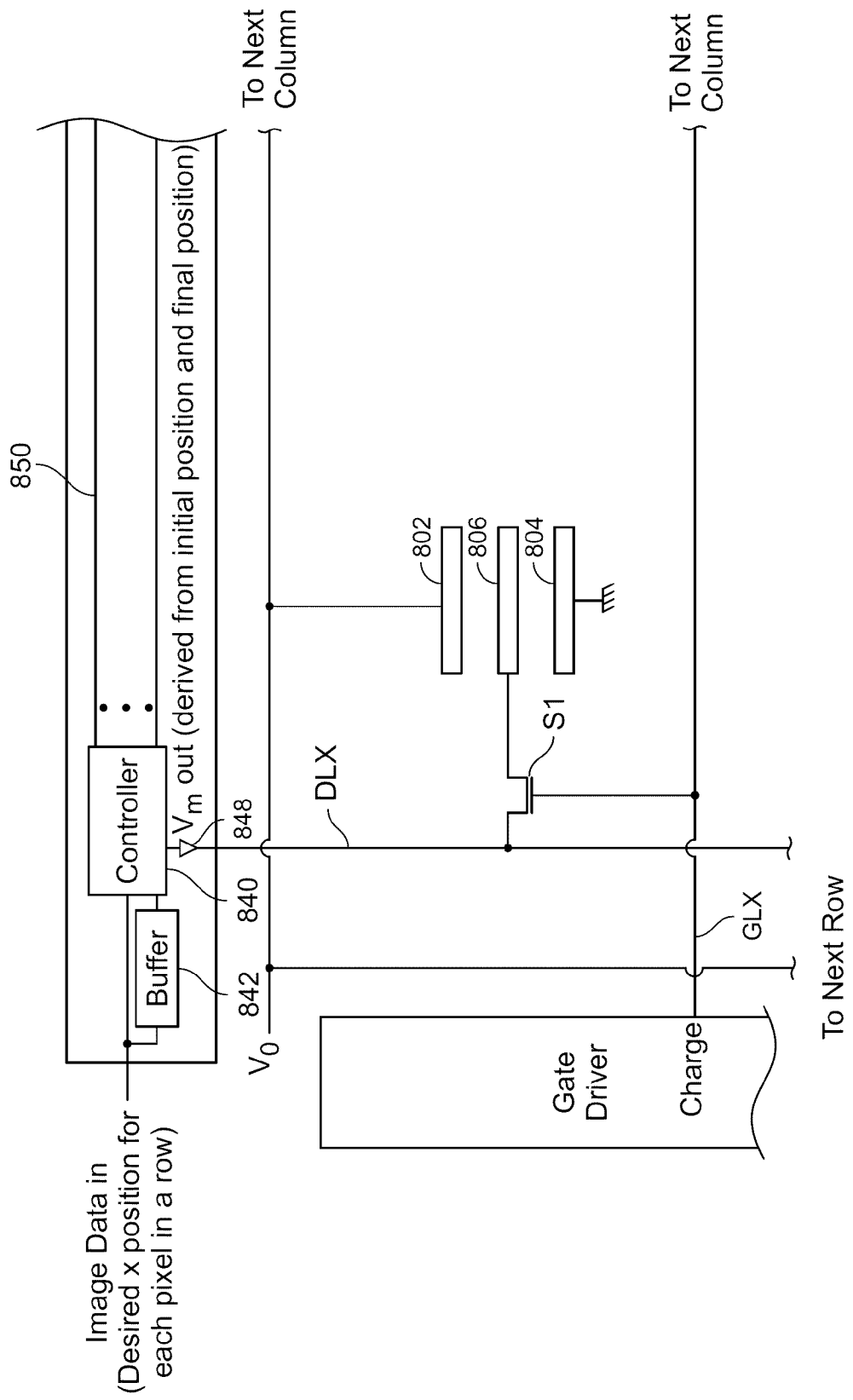
FIG. 8 illustrates a portion of a display array driving circuit according to some implementations.

FIG. 8 illustrates a portion of a driving circuit according to some implementations configured according to these principles. As illustrated in FIG. 8, a data driver circuit may include a controller 840 configured to control and coordinate driving of an array of display elements. The circuit of FIG. 8 also illustrates components of a pixel, which include the fixed first layer 802, fixed second layer 804, movable third layer 806, and switch $S_1$. As illustrated, the fixed second layer 804 is connected to a ground voltage. As discussed above, in an alternative implementation, the fixed first layer 802 may be connected to ground, while the fixed second layer 804 may be connected to the voltage source $V_0$.

The controller 840 may receive image data indicating the final desired position of the middle layer. This image data may be numerical data directly defining the desired final position of the middle layer. Alternatively, the image data may define a desired color, luminance, or combination thereof, and the controller 840 may generate a final position value from this image data. The controller 840 may also be configured to retain in memory the previous pixel position or receive the previous pixel position through a buffer 842. Using the new desired position and the previously written position, the controller 840 may determine the voltage level $V_m$ in the manner described above to apply to the movable third layer 806 through an output buffer 848. The controller has additional outputs 850 that connect to respective additional output drivers 848, one for each column of the array. Thus, for this implementation as well as the implementations described below, the operations may be performed in parallel on every pixel in a row of a display array.

Figure 9:
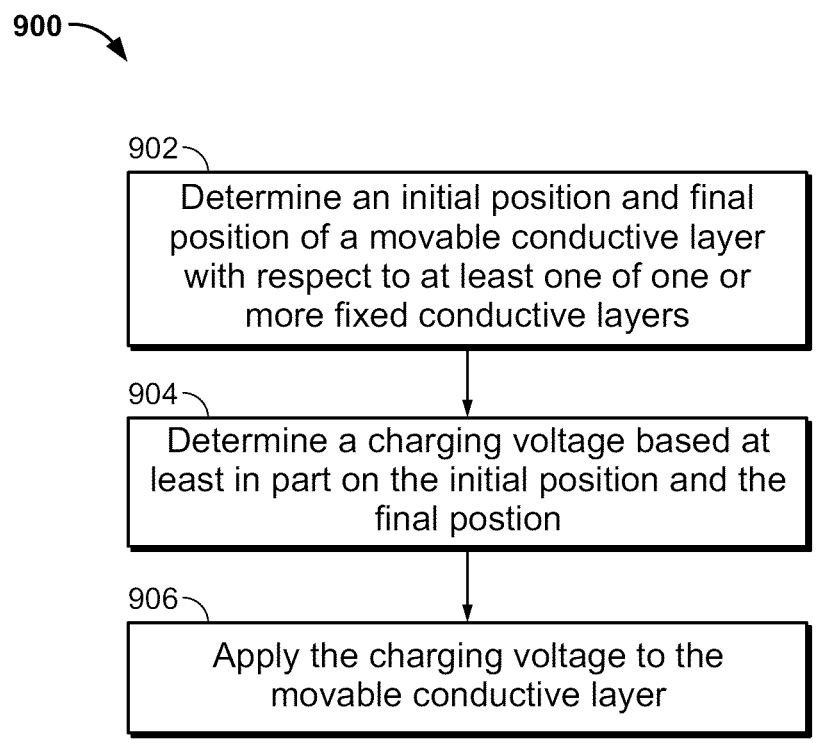
FIG. 9 illustrates a flowchart of a method for controlling the position of a movable conductive layer according to some implementations.

FIG. 9 illustrates a flowchart of a method for controlling the position of a movable conductive layer according to some implementations. The method 900 includes determining an initial position and a final position of the movable conductive layer (such as movable third layer 806) with respect to at least one of one or more fixed conductive layers (such as fixed first layer 802 and/or fixed second layer 804) as illustrated by a block 902. A charging voltage may be determined based at least in part on the initial position and the final position as illustrated by a block 904. The charging voltage may be applied to the movable conductive layer to move the movable conductive layer to a desired position as illustrated by a block 906.

The implementation of FIGS. 8 and 9 assumes that the spring constant K and launch condition $\Delta x_L$, are known and are substantially the same for all of the pixels of the display array. When this is the case, the calculation of the voltage $V_m$ can be performed with these known values and using only the initial pixel state and desired final pixel state. When this is not the case, different pixels may require different charges to be moved to the same positions. Pixel by pixel adjustments to the charge being applied in order to account for pixel by pixel variations in K and $\Delta x_L$, can be done in a variety of ways. Such adjustments may include, among other methods, a sequential adjustment, a calibrated adjustment based on parameters individual pixels of the display, or combinations thereof. A sequential adjustment method will be described first, followed by a description of a calibrated parameters adjustment method.

Figure 10:
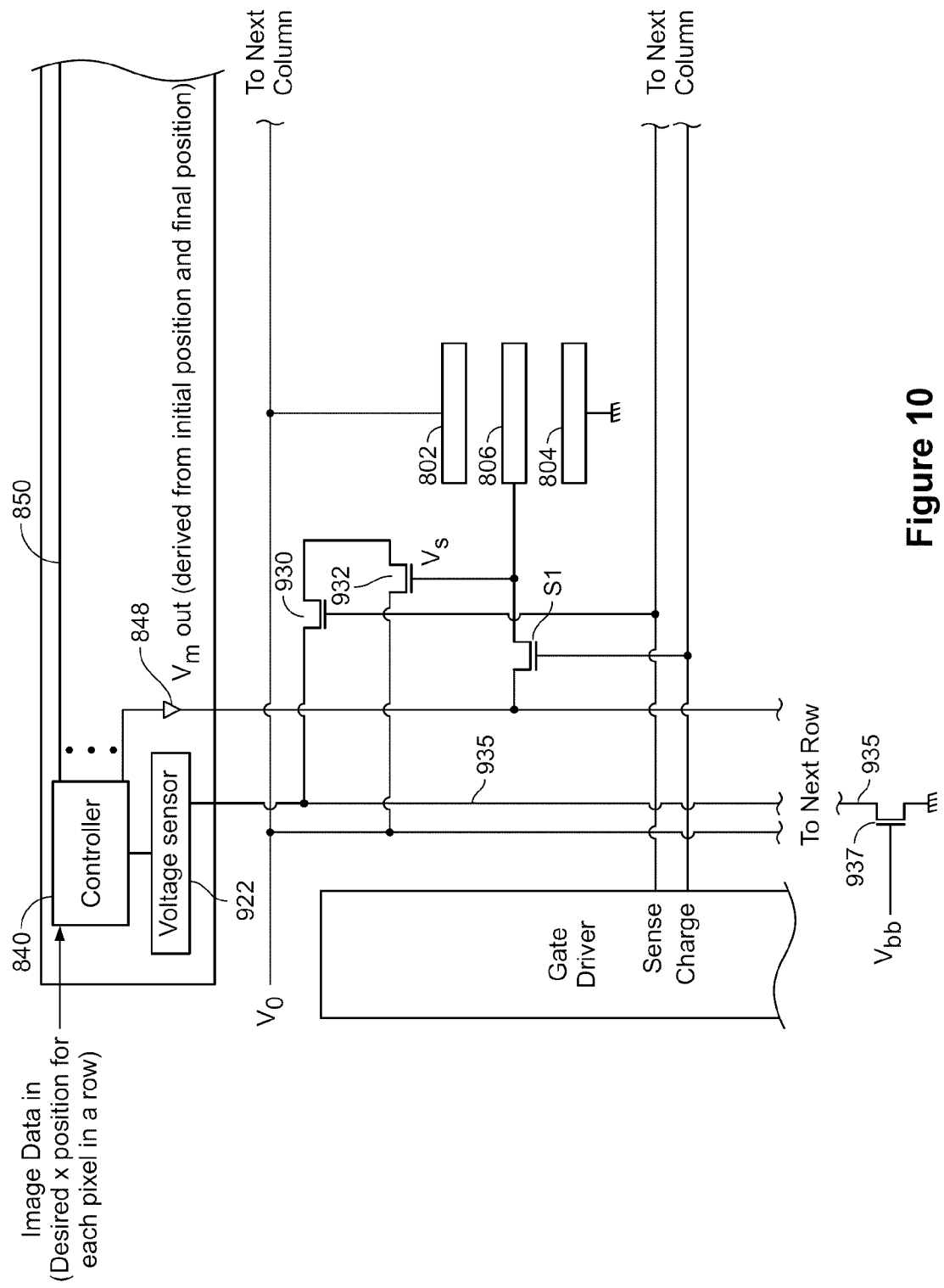
FIG. 10 illustrates a portion of a display array driving and position sensing circuit according to some implementations.

In one implementation, position sensing circuitry for sensing the actual position of the middle layer 806 can be incorporated into the driving circuitry. This is illustrated in FIG. 10, where FIG. 10 illustrates a portion of a display array driving and position sensing circuit according to some implementations. In FIG. 10, the controller also has additional input/output lines 850 for respective additional voltage sensors 922 and output drivers 848, one each for each column of the array. Switch 51 connects the column drive line (such as at the output of the output driver 848) to the mirror electrode 806 to drive the mirror with the voltage $V_m$, while the gate of S1 is driven by the Charge row drive line. The mirror electrode 806, when not driven by the column drive line through switch 51, can be sampled by the source follower transistor 932 which can be switched by transistor 930 to connect it to (or isolate it from) the sense line 935 that is coupled to the voltage sensor 922. In the implementations of FIG. 10, the sense line 935 is biased by a current source at the bottom of the column, as illustrated by transistor 937 (such as a thin-film transistor) having a gate connected to a bias voltage $V_{bb}$.

The approximate sense voltage $V_S$ when the mirror is at position x is given by Equation 7:

$$V_s(x) = \frac{(d_1 + x)}{d_1 + d_2} V_0 \rightarrow x = \frac{(d_1 + d_2)}{V_0} V_s - d_1 \quad (7)$$

Using the linear approximation of $Q_m$ derived in Equation 3, the drive voltage needed to drive the mirror to position $x_1$ from a current position $x_0$ may be given by Equation 8:

$$V_m(x_0, x_1) \approx V_S(x_0) - \frac{K(x_1 - \Delta x_L)(d_1 + x_1)(d_2 - x_1)}{\varepsilon_0 A_P V_0} \quad (8)$$

According to Equation 8, the voltage to apply to move the movable third layer 806 from $x_0$ to $x_1$ may be determined using approximate or average values for K and $\Delta x_L$, which will be denoted as $\overline{K}$ and $\overline{\Delta x_L}$. If this determined voltage $V_m$ is applied, and the spring constant is actually equal to $\overline{K}$ and the launch condition is actually given by $\overline{\Delta x_L}$, then the mirror will move precisely to $x_1$. If, however, the spring constant K and/or the launch condition $\Delta x_L$, are different for this pixel than the calibrated initial values, then the movable third layer 806 may end at a position that is different from the desired position. Assuming that the values of K and $\Delta x_L$, are different than the values $\overline{K}$ and $\overline{\Delta x_L}$, the actual position of the movable third layer 806 may be measured with the voltage sensor 922 using Equation 7, and the applied charge may be adjusted based on the actual (incorrect) position and the desired final position $x_1$.

Figure 11:
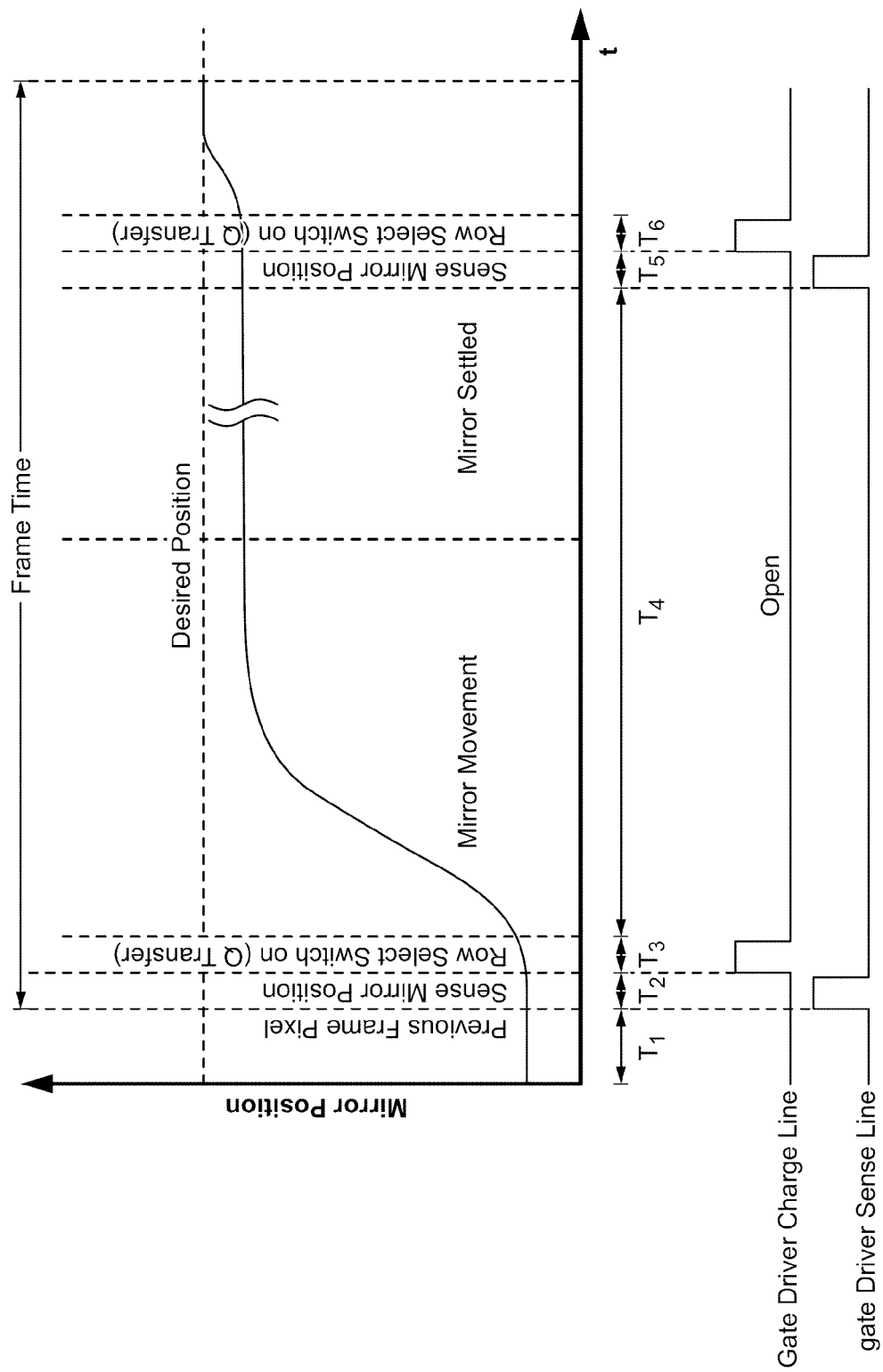
FIG. 11 illustrates an example of a method of sequential adjustment of a movable third layer 806 according to some implementations.

FIG. 11 illustrates an example of a method of sequential adjustment of a movable third layer 806 according to some implementations. As illustrated in FIG. 11, during a first time period T1, a pixel position may correspond to the position during a previous frame. Following first time period T1, a sensing signal may be triggered to sense1 the voltage of the middle layer of the pixel. For example, with returned reference to FIG. 10, during first sense time period T2, the gate driver Sense line may be asserted to connect the output of voltage sense transistor 932 to the sense line 935 and thus to the voltage sensor 922 for obtaining a signal indicative of the voltage $V_S$ applied to the gate of sense transistor 932 by mirror layer 806. Based on the sensed voltage $V_S$ (used to determine current position), the desired final position, nominal spring stiffness $\overline{K}$, and nominal launch condition $\overline{\Delta x_L}$, a voltage $V_m$ to apply to the movable third layer 806 may be determined and applied to the data line via output buffer 848. Following first sense time period T2, the gate driver sense line is de-asserted to disconnect the movable third layer 806 from the voltage sensor 922. The gate driver charge line is then asserted, and the voltage $V_m$ is applied to the movable third layer 806 during first charge time period T3.

Following first charge time period T3 and during transition time period T4, the movable third layer 806 moves from the current position (such as $x_0$) to a next position (such as $x_1$) based on the applied voltage $V_m$ and corresponding charge $Q_m$. As illustrated, transition time period T4 may be substantially greater than time periods T2 and T3. In some implementations, during transition time period T4, a controller (e.g. controller 840) may be configured to sequentially write data to other rows of pixels in the display 30 using the same procedure. For example, following the application of the voltage $V_m$ during charge time period T3, the controller 840 may be configured to sense a current position of pixels in a next row, and apply a determined voltage based on the sensed position and a desired position of the pixels in the next row. In this way, data may be written to the display 30 sequentially while the movable layers 806 transition from a current position to a next position. Transition time period T4 may correspond to a duration that allows data to be written to all rows of a display 30, or a section of the display 30, prior to returning to the first row.

Following the transition time period T4, the current position of the movable third layer 806 may be offset from the desired position. The current position may be determined based on a second measurement of the voltage $V_S$ of the movable third layer 806 during a second sense time period T5 in the same manner as is done in time period T2. Based on this measured position and the desired final position $x_1$, a new voltage $V_m$ may be derived which corrects this initial error in the position of the movable layer 806.

The determination of the voltage $V_m$ applied during the second charge time T6 may be implemented as shown in Equation 9:

$$V_C(x_1, x_F) = V_S(x_F) + \left(\frac{1}{C_1(x_F) + C_2(x_F)}\right) Q_m(\overline{K}, \overline{\Delta x_L}, x_F) + (x_F - x_1) \frac{\partial Qm}{\partial x}\bigg|_{x=x_1} \quad (9)$$

The position of the movable third layer 806 may be sequentially adjusted during the same frame time. Further, as discussed above, other rows of the display may be written while the movable third layer 806 of a pixel in a given row transitions to a position corresponding to the applied voltage $V_m$. In some implementations, for a frame rate of 15 Hz, each pixel may be adjusted at least twice within $\frac{1}{15}^{th}$ of a second.

Another method of adjusting the position of the movable third layer 806 which may be used alternatively to the sequential adjustment method, or in combination with the sequential adjustment method, is a specifically calibrated placement of the movable third layer 806 based on separate measurements of the mechanical parameters K and $\Delta x_L$, associated with each pixel of an array. An example of calibrated adjustment will be described with reference to FIGS. 12-15.

In some implementations, the calibration adjustment method may include an accurate measurement of independent parameters related to each of the pixels and a determination of a voltage $V_m$ based on the measured parameters. The measured parameters may include the launch position $\Delta x_L$, and the spring stiffness K of each pixel.

Figure 12:
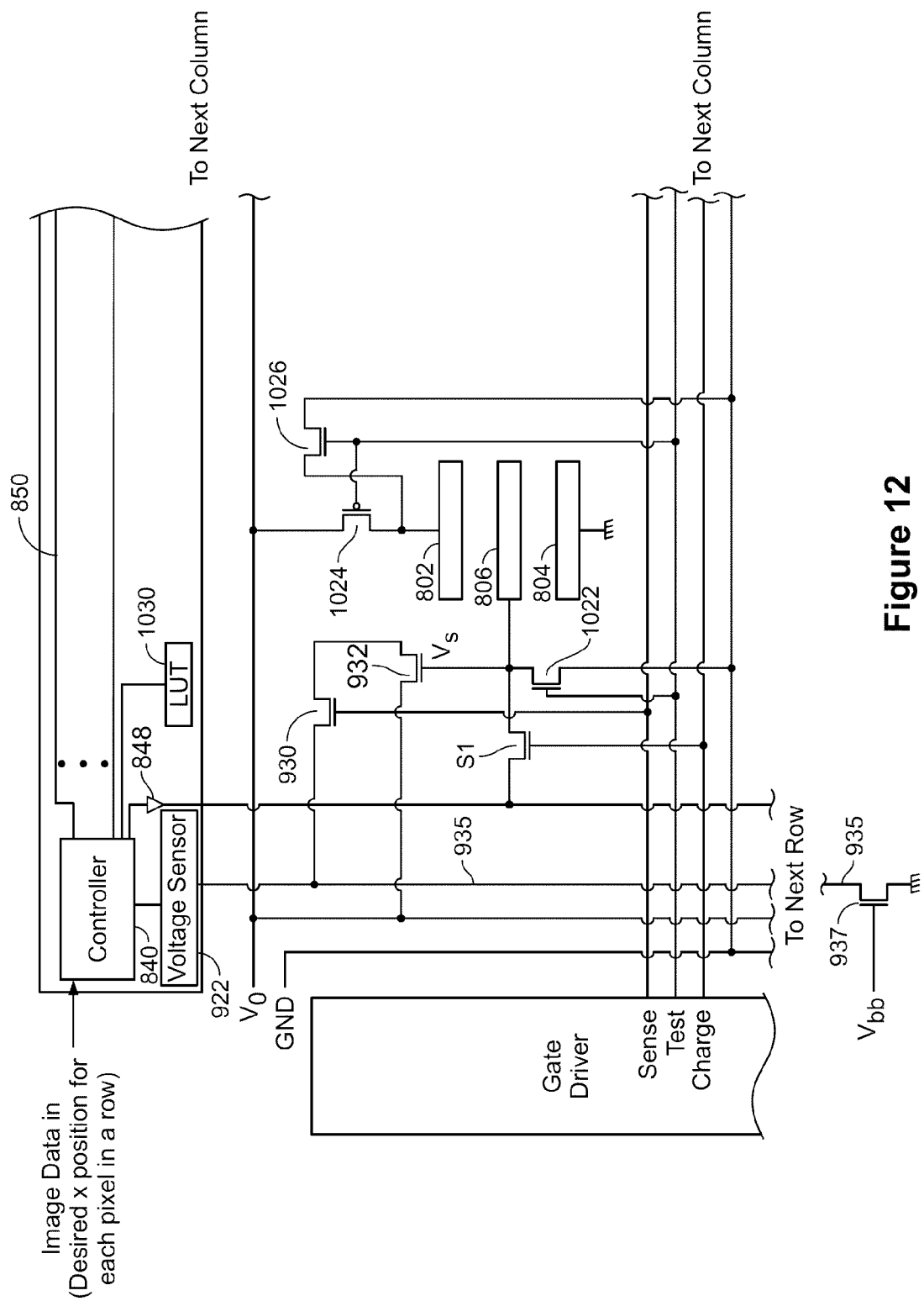
FIG. 12 illustrates a portion of a display array driving and sensing circuit including circuitry for testing pixel characteristics.

FIG. 12 illustrates a portion of a display array driving and sensing circuit including circuitry for testing pixel characteristics. In this implementation, the gate driver includes an additional test line output coupled to the gates of n-type transistors 1022, 1024, and p-type transistor 1026. When the gate driver Test line is asserted, transistor 1022 connects movable layer 806 to ground and transistor 1026 connects fixed layer 802 to ground. When the Test line is de-asserted, the movable layer 806 is de-coupled from ground, and fixed layer 802 is coupled to $V_0$ through p-type transistor 1024. These connections, along with the sensing and driving circuits described above, can be used to determine individual values for K and $\Delta x_L$, as described below with reference to FIGS. 13 and 14. The values determined for each pixel may be stored in a look-up table (LUT) 1030 in the driver circuit and used to calculate correct values for $V_m$ for each pixel rather than relying on nominal or average values $\overline{K}$ and $\overline{\Delta x_L}$. This may eliminate the need for the sequential correction procedure described above with reference to FIGS. 10 and 11.

Figure 13:
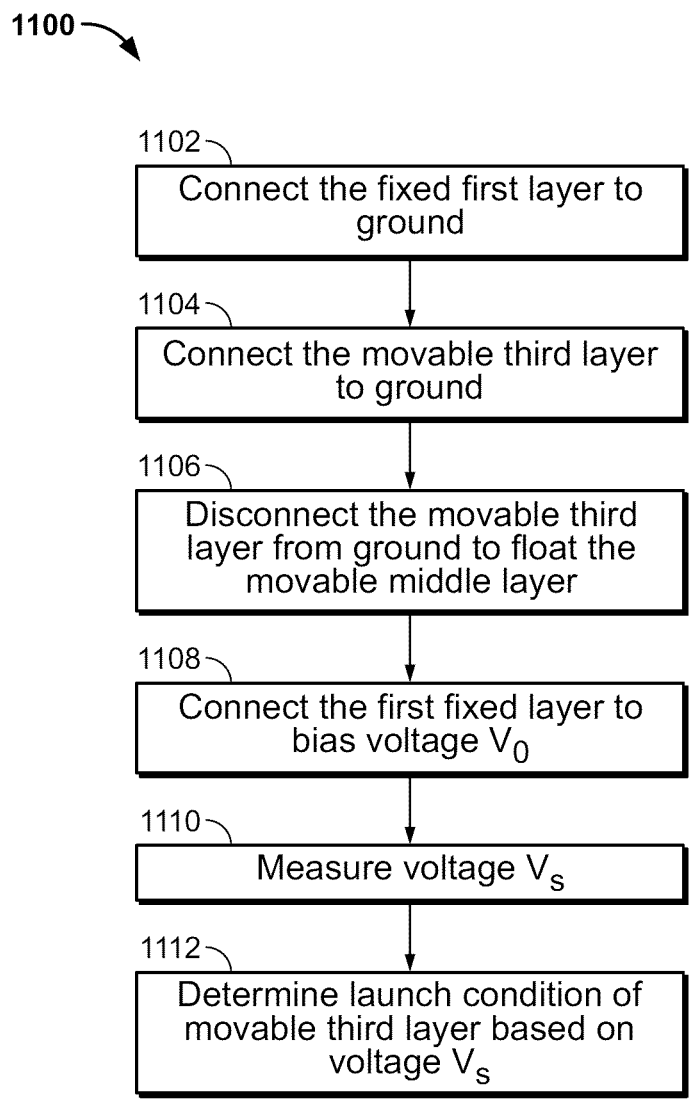
FIG. 13 is a flowchart of a method of determining the launch condition $\Delta x_L$, according to some implementations.

FIG. 13 is a flowchart of a method of determining the launch condition $\Delta x_L$, according to some implementations. The method 1100 may include connecting a fixed first layer 802 to a ground voltage as illustrated by a block 1102. For example, with returned reference to FIG. 12, the gate driver Test line may be asserted, turning transistor 1024 off and 1026 on, thus connecting the fixed first layer 802 to ground. The movable third layer 806 may then be connected to ground as illustrated by a block 1104 (such as by turning on transistor 1022 with the same Test line assertion). This removes all charge from the layers of the pixel, and the middle layer 806 will move to a position of purely mechanical equilibrium. As illustrated by a block 1106, the movable third layer 806 may then be disconnected from ground such that the movable third layer 806 is in a floating state, and the first fixed layer 802 may be connected to bias voltage $V_0$ as illustrated by a block 1108. Both of these acts may be accomplished at the same time by de-asserting the Test line. At a block 1110, the voltage $V_S$ of the movable third layer 806 may be measured (such as by asserting the gate driver Sense line). The voltage $V_S$ measured in this condition is proportional to the launch condition $\Delta x_L$, since any deviation in position of the movable third layer 806 will correspond to a fabrication induced mechanical bias, or the like. At a block 1112 the launch condition $\Delta x_L$, of the movable third layer may be determined based on the voltage $V_S$ which is related to the position of the middle layer under these conditions. In some implementations, the determined launch condition $\Delta x_L$, may be saved in a look-up-table (such as LUT 1030) as discussed above with reference to FIG. 12.

Figure 14:
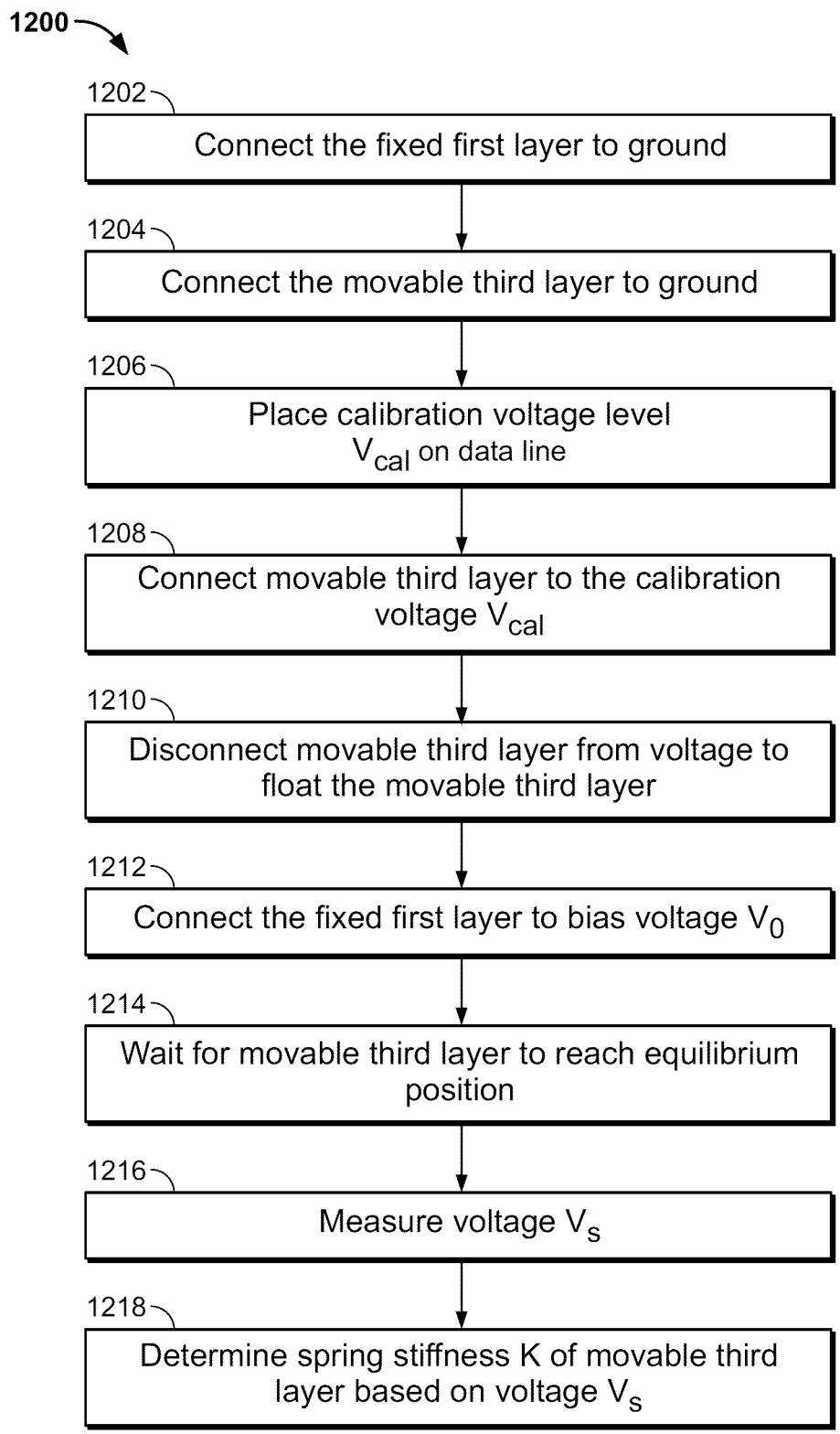
FIG. 14 is a flowchart of a method of determining the spring stiffness K according to some implementations.

FIG. 14 is a flowchart of a method of determining the spring stiffness K for a pixel according to some implementations. The method 1200 includes connecting the fixed first layer 802 to ground as illustrated by a block 1202, and connecting the movable third layer 806 to ground as illustrated by a block 1204, which may be done as described above with respect to FIGS. 12 and 13. A calibration voltage $V_{Ca1}$ as illustrated by a block 1206 may then be applied to the data line. The calibration voltage $V_{Ca1}$ may correspond to a voltage level (such as $V_0/2$) that corresponds to a movable third layer 806 charge at a quiescent position capacitance which is tolerant to launch condition variations. At a block 1208, the movable third layer 806 may be connected to the calibration voltage $V_{Ca1}$ by, for example, asserting the gate driver Charge line of FIG. 12. As illustrated by a block 1210, the movable third layer 806 may then be disconnected from the voltage signal $V_{Ca1}$ such that the movable third layer 806 is in a floating state (such as by de-asserting the Charge line). At a block 1212, the fixed first layer 802 may be connected to the bias voltage $V_0$. The bias voltage $V_0$ is applied to the fixed first layer 802 for a time period until the movable third layer 806 reaches an equilibrium position as illustrated by a block 1214. At a block 1216, the voltage $V_S$ of the movable third layer 806 may be measured (such as by asserting the gate driver Sense line). The voltage $V_S$ measured in this condition is related to the spring stiffness K, and at a block 1218 the spring stiffness K of the movable third layer may be determined based on the voltage $V_S$. In some implementations, the determined spring stiffness K may be saved in a look-up-table (such as LUT 1030) as discussed above with reference to FIG. 12.

Figure 15:
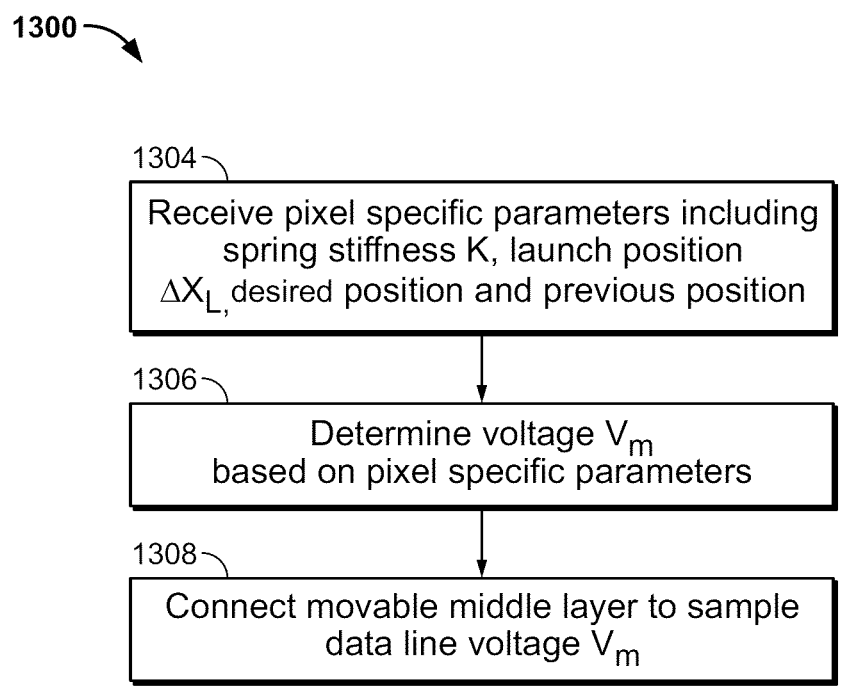
FIG. 15 is a flowchart of a calibrated adjustment method according to some implementations.

Based on the measurements of the launch condition $\Delta x_L$, the spring stiffness K, and the values of the previous pixel position and the desired pixel position, the voltage $V_m$ to be applied to the movable third layer 806 for each pixel individually may be determined. FIG. 15 is a flowchart of a calibrated adjustment method 1300 according to some implementations. At a block 1304, pixel specific parameters including the launch condition $\Delta x_L$, spring stiffness K, previous position, and desired position may be received and/or determined. For example, the launch condition $\Delta x_L$, and spring stiffness K may be determined according to measurements as discussed with reference to FIGS. 11 and 12, respectively and which have been stored in LUT 1030 of FIG. 12. At a block 1306, a voltage level $V_m$ is determined based at least in part on the parameters. At a block 1308, the movable third layer 1308 may be connected to the data line (such as by asserting the gate driver Charge line). As a result, the movable third layer may be accurately positioned by application of the voltage $V_m$.

In the implementation described above, the LUT 1030 stores the set of pixel parameters $\Delta x_L$, and K previously measured for each pixel, and these are retrieved to derive a $V_m$ that will move the layer 806 from a current position to a desired final position. In some implementations, the LUT may store level $V_m$ values directly, which are accessed by the values for the initial position and desired final position. In these implementations, a table of level $V_m$ values may be individually provided for each pixel, where the level $V_m$ values in each table are derived based on the specific $\Delta x_L$, and K values for that pixel.

Figure 16:
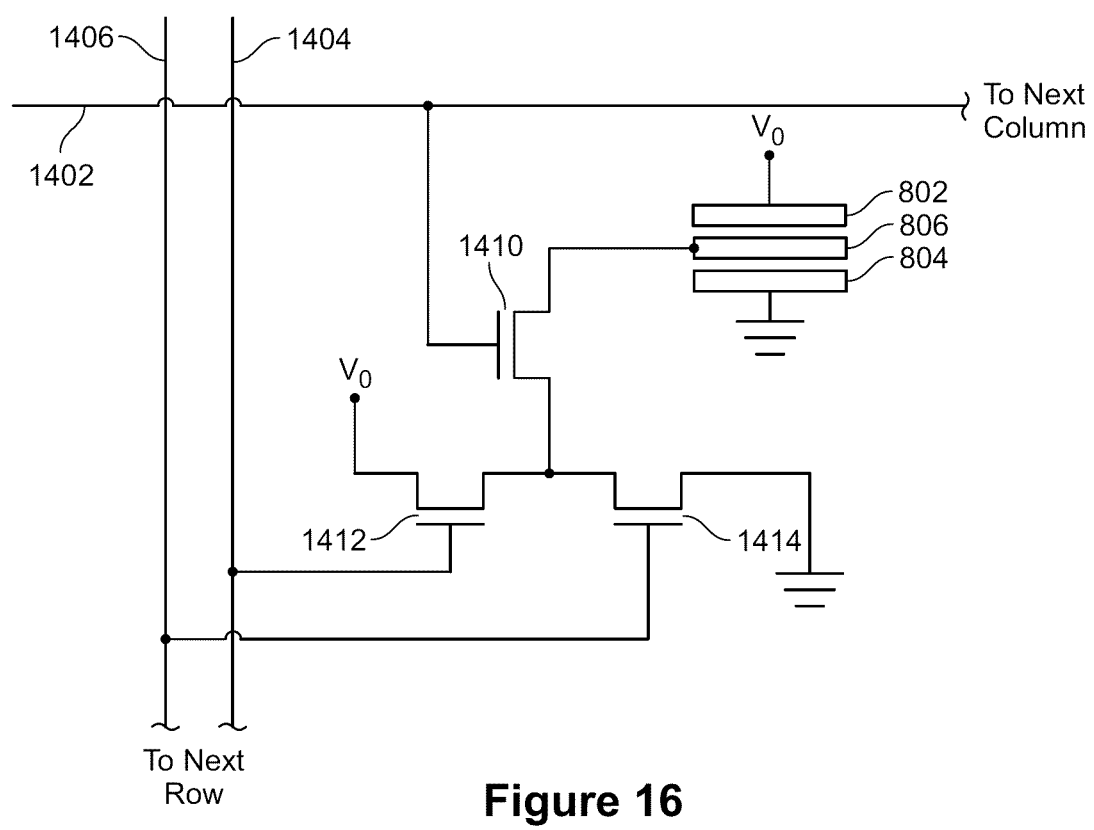
FIG. 16 illustrates an example of a circuit configured to generate a pulsed voltage signal for inducing charge to the movable third layer 806.

In the above described implementations, the voltage $V_m$ applied to the movable third layer 806 is a variable analog voltage level output by the data driver. In alternative implementations, the voltage applied may include a pulse or series of pulses. A pulsed voltage signal may include a temporally modulated voltage signal to induce the desired charge $Q_m$ to the movable middle layer 806 using one or more fixed reference voltages. FIG. 16 illustrates an example of a circuit configured to generate a pulsed voltage signal for inducing charge to the movable third layer 806. As illustrated in FIG. 16, a row select signal 1402 may be used to selectively enable the connection of the movable third layer 806 to a first transistor 1412 and a second transistor 1414. The second transistor 1414 is biased to a constant voltage level (such as $V_0$) and the first transistor is biased to ground. The first transistor 1412 and the second transistor 1414 are turned on/off in sequence through a corresponding first column electrode 1404 connected to the gate of the first transistor 1412, and a second column electrode 1406 connected to the gate of the second transistor 1414. One of the voltage $V_0$ and ground is applied in according to a pulsed waveform through a third transistor 1410 having an output connected to the movable third layer 806. Based on the configuration of FIG. 16, the electrodes 1404 and 1406 switch between binary values whose exact values are not critical to the operation of the charge injection process.

Figure 17:
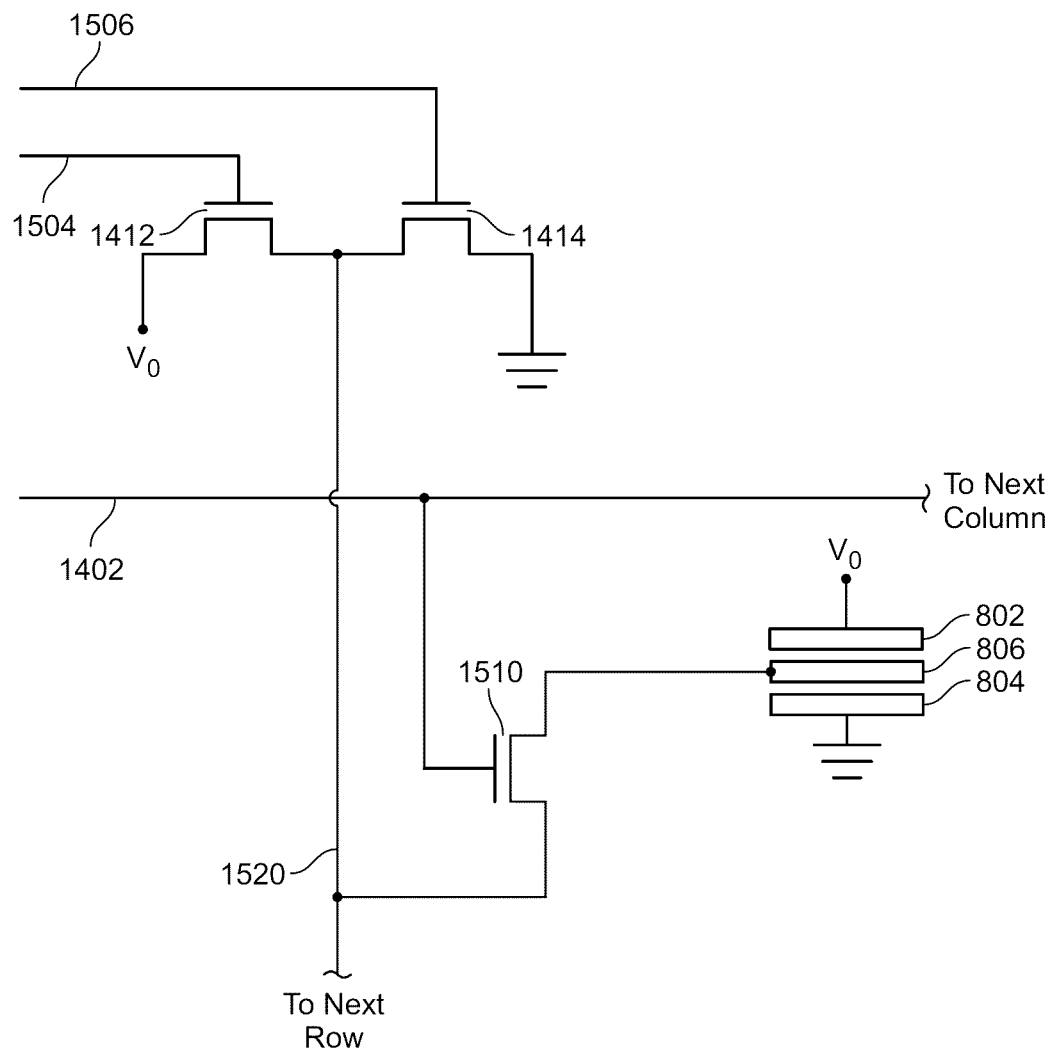
FIG. 17 illustrates another example of a circuit configured to generate a pulsed voltage signal for inducing charge to the movable third layer 806.

FIG. 17 illustrates another example of a circuit configured to generate a pulsed voltage signal for inducing charge to the movable third layer 806. As illustrated in FIG. 17, a gate of the first transistor is connected to a first select signal 1504, while a gate of the second transistor is connected to a second select signal 1506. As in FIG. 16, the first transistor 1412 is biased to a constant voltage level, while the second transistor is biased to ground. A single electrode 1520 is configured to connect an output of one of the first transistor 1412 and the second transistor 1414 to the third transistor 1510. As a result, the single column electrode 1520 switches between $V_0$ and ground in sequence through operation of the first transistor 1412 and the second transistor 1414. The row select signal 1402 enables the connection of the movable third layer 806 to the output of the third transistor 1510.

Figure 18A:
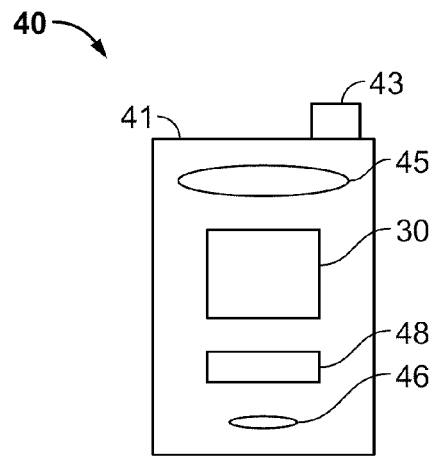
FIGS. 18A and 18B show examples of system block diagrams illustrating a display device that includes a plurality of interferometric modulators.
Figure 18B:
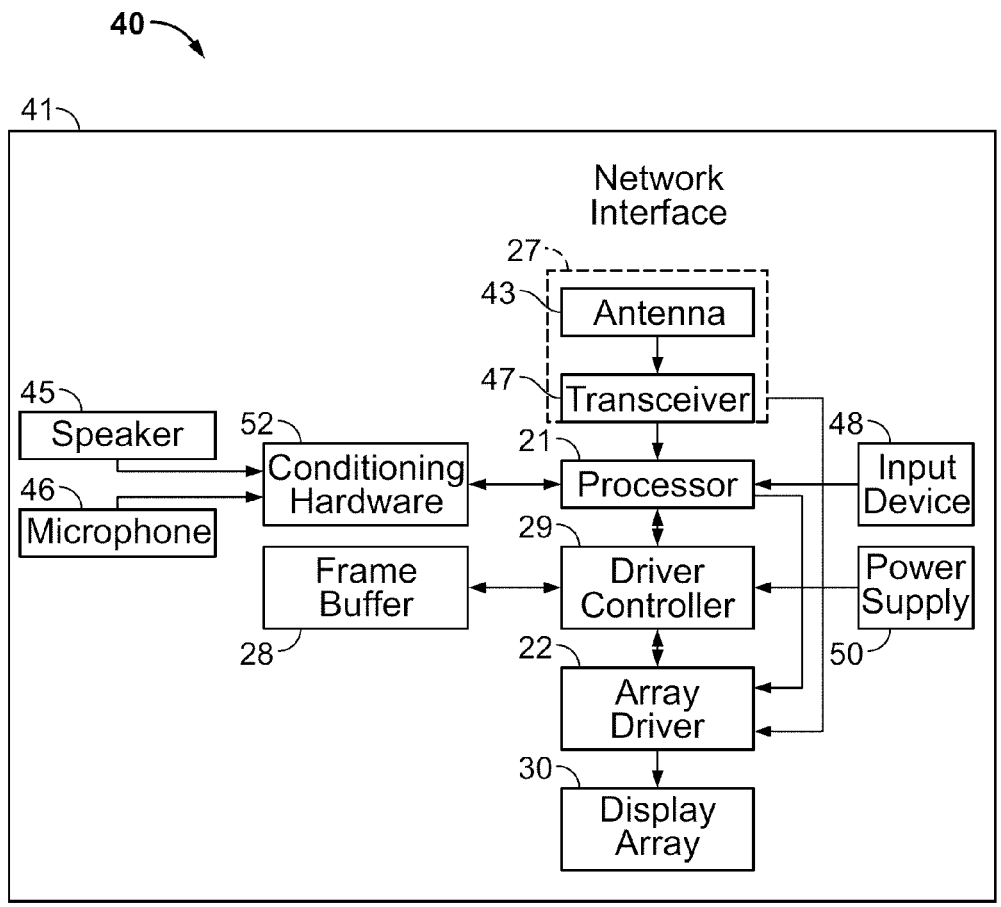

FIGS. 18A and 18B show examples of system block diagrams illustrating a display device 40 that includes a plurality of interferometric modulators. The display device 40 can be, for example, a cellular or mobile telephone. However, the same components of the display device 40 or slight variations thereof are also illustrative of various types of display devices such as televisions, e-readers and portable media players.

The display device 40 includes a housing 41, a display 30, an antenna 43, a speaker 45, an input device 48, and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber, and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an interferometric modulator display, as described herein.

The components of the display device 40 are schematically illustrated in FIG. 18B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (such as by filtering a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 can provide power to all components as required by the particular display device 40 design.

The network interface 27 includes the antenna 43 and the transceiver 47 so that the display device 40 can communicate with one or more devices over a network. The network interface 27 also may have some processing capabilities to relieve, data processing requirements of other components, such as of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g or n. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation, and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 may correspond to the controller 840 as discussed above with reference to FIGS. 10 and 12. In some implementations, the driver controller 29 can re-format the raw image data into a data flow having a raster-like format, such that it has a time order suitable for scanning across the display array 30. Then the driver controller 29 sends the formatted information to the array driver 22. In some implementations, the array driver 22 may include the gate drive and one or more of output drivers 848 as described above with reference to FIGS. 10 and 12. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (such as an IMOD controller). Additionally, the array driver 22 can be a conventional driver or a bi-stable display driver (such as an IMOD display driver). Moreover, the display array 30 can be a conventional display array or a bi-stable display array (such as a display including an array of IMODs). In some implementations, the driver controller 29 can be integrated with the array driver 22. Such an implementation is common in highly integrated systems such as cellular phones, watches and other small-area displays.

The array driver 22 may be implemented on a separate substrate or using a separate chip from the display array 30. The voltage sources $V_0$ and $V_m$ discussed above may also be located remotely from the interferometric modulator. For example, one or both of the voltage sources $V_0$ and $V_m$ may be implemented in the array driver 22, and/or one or both of the voltage sources $V_0$ and $V_m$ could be controlled or receive instructions from the array driver 22, the driver controller 29, or the processor 21.

In some implementations, the input device 48 can be configured to allow a user to control the operation of the display device 40. The input device 48 can include a keypad, such as a QWERTY keyboard or a telephone keypad, a button, a switch, a rocker, a touch-sensitive screen, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices as are well known in the art. For example, the power supply 50 can be a rechargeable battery, such as a nickel-cadmium battery or a lithium-ion battery. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

Figure 19:
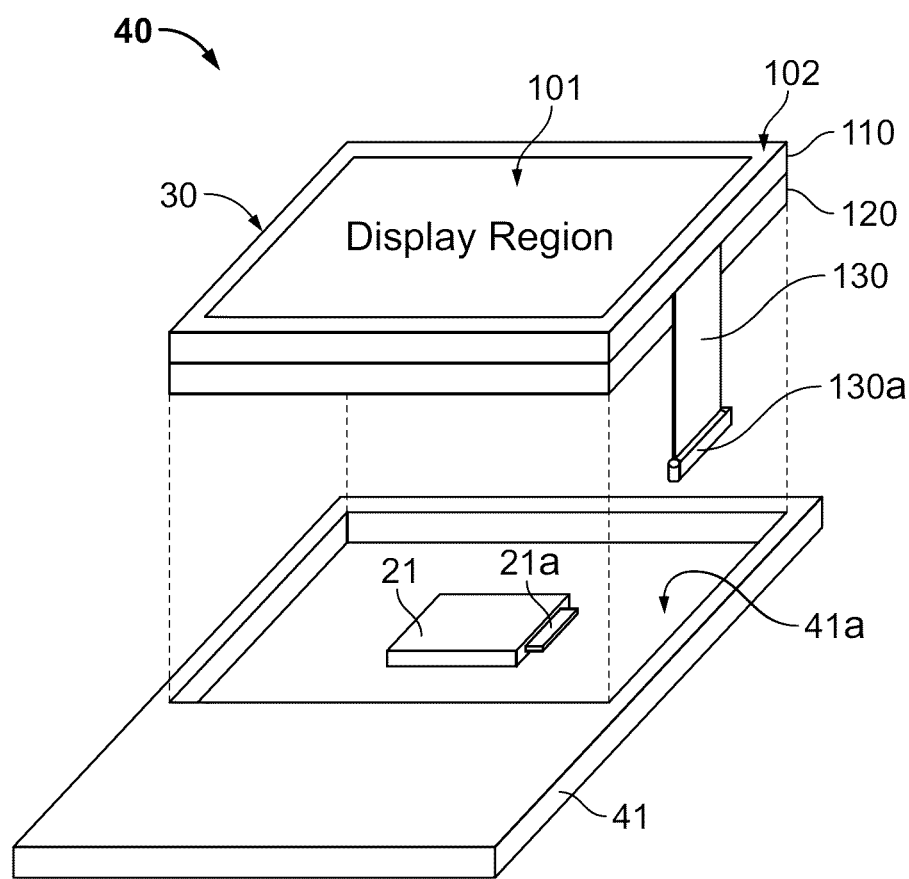
FIG. 19 is an example of a schematic exploded perspective view of an electronic device having an optical MEMS display.

FIG. 19 is an example of a schematic exploded perspective view of the electronic device 40 of FIGS. 16A and 16B according to one implementation. The illustrated electronic device 40 includes a housing 41 that has a recess 41*a* for a display array 30. The electronic device 40 also includes a processor 21 on the bottom of the recess 41*a* of the housing 41. The processor 21 can include a connector 21*a* for data communication with the display array 30. The electronic device 40 also can include other components, at least a portion of which is inside the housing 41. The other components can include, but are not limited to, a networking interface, a driver controller, an input device, a power supply, conditioning hardware, a frame buffer, a speaker, and a microphone, as described earlier in connection with FIG. 18B.

As discussed above, since the charge of movable third layer 806, and corresponding position of the movable third layer 806 is determined in response to supplied voltages $V_m$, a table or other data structure may be created to correlate the supplied voltages $V_m$ to the actual position of the movable third layer 806. In this way, the voltage to be applied to the movable third layer 806 may be retrieved based on a desired position via the look-up table during subsequent operations instead of calculated, thereby conserving power. Further, the table may allow drive circuitry which supplies the voltages $V_m$ to adjust drive voltages so as to correctly drive the movable third layer 806 to a desired position. The table may be any structure or compilation of data in which correlated values may be stored. The table may be stored in a volatile or non-volatile memory, for example in a storage device or unit (not shown) implemented in the display device 40, discussed above. The voltage sensing functions and/or writing of data to the table may be performed by a processor, for example by the processor 21 of the display device 40. In some embodiments, the processor 21 includes storage for some or all of the table values.

The display array 30 can include a display array assembly 110, a backplate 120, and a flexible electrical cable 130. The display array assembly 110 and the backplate 120 can be attached to each other, using, for example, a sealant.

The display array assembly 110 can include a display region 101 and a peripheral region 102. The peripheral region 102 surrounds the display region 101 when viewed from above the display array assembly 110. The display array assembly 110 also includes an array of display elements positioned and oriented to display images through the display region 101. The display elements can be arranged in a matrix form. In some implementations, each of the display elements can be an interferometric modulator. Also, in some implementations, the term "display element" may be referred to as a "pixel."

The backplate 120 may cover substantially the entire back surface of the display array assembly 110. The backplate 120 can be formed from, for example, glass, a polymeric material, a metallic material, a ceramic material, a semiconductor material, or a combination of two or more of the foregoing materials, in addition to other similar materials. The backplate 120 can include one or more layers of the same or different materials. The backplate 120 also can include various components at least partially embedded therein or mounted thereon. Examples of such components include, but are not limited to, a driver controller, array drivers (for example, a data driver and a scan driver), routing lines (for example, data lines and gate lines), switching circuits, processors (for example, an image data processing processor) and interconnects.

The flexible electrical cable 130 serves to provide data communication channels between the display array 30 and other components (for example, the processor 21) of the electronic device 40. The flexible electrical cable 130 can extend from one or more components of the display array assembly 110, or from the backplate 120. The flexible electrical cable 130 can include a plurality of conductive wires extending parallel to one another, and a connector 130*a* that can be connected to the connector 21*a* of the processor 21 or any other component of the electronic device 40.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus for driving a display element, the display element including a movable conductive layer and one or more fixed conductive layers, the apparatus comprising:
    a circuit configured to determine an initial position of the movable conductive layer with respect to at least one of the one or more fixed conductive layers, the circuit comprising at least one transistor, the at least one transistor having its gate coupled to the moveable layer; and
    a controller configured to:
        determine a charging voltage based at least in part on the initial position; and
        apply the charging voltage to the movable conductive layer.

2. The apparatus as recited in claim 1, wherein the charging voltage is determined based at least in part on a target final position of the movable conductive layer.

3. The apparatus as recited in claim 1, wherein the controller is capable of applying the charging voltage for a period of time that is less than a mechanical response time of the movable conductive layer.

4. The apparatus as recited in claim 3, comprising a switch capable of isolating the movable conductive layer from the charging voltage prior to the movable conductive layer significantly responding to the applied voltage.

5. The apparatus as recited in claim 4, wherein the switch comprises a metal oxide thin film transistor.

6. The apparatus as recited in claim 5, wherein the metal oxide thin film transistor comprises an indium gallium zinc oxide switch.

7. The apparatus as recited in claim 6, wherein the circuit capable of determining an initial position of the movable conductive layer includes a voltage sensor.

8. The apparatus as recited in claim 7, wherein the voltage sensor is capable of sensing the position of the movable conductive layer subsequent to applying the charging voltage, and wherein the controller is capable of:
    determining a corrective voltage based at least in part on the position sensed subsequent to applying the charging voltage; and
    applying the determined corrective voltage to the movable conductive layer.

9. The apparatus as recited in claim 5, further comprising applying a bias voltage across the first and second fixed conductive layers.

10. The apparatus as recited in claim 1, wherein the movable conductive layer and the one or more fixed conductive layers are included in a first display element, the first display element being disposed in an array of display elements.

11. The apparatus as recited in claim 10, wherein the controller is capable of determining a charging voltage to apply to each of a plurality of the display elements in the array using a value of a mechanical property that is common to the plurality of the display elements.

12. The apparatus as recited in claim 1, further comprising a lookup table having values corresponding to each of the plurality of display elements, and wherein the controller is capable of determining the charging voltage for each display element using the stored values.

13. The apparatus as recited in claim 12, wherein the controller is capable of determining a charging voltage to apply to each of a plurality of the display elements in the array based at least in part on respective mechanical properties of each of the plurality of display elements.

14. The apparatus as recited in claim 1, wherein the controller is capable of determining one or both of a spring constant or a launch bias of the movable conductive layer.

15. The apparatus as recited in claim 1, wherein the movable conductive layer is disposed between the first and second fixed conductive layers.

16. The apparatus as recited in claim 1, further comprising:
    a display, the display element being one in an array of display elements of the display;
    a processor that is capable of communicating with the display, the processor being configured to process image data; and
    a memory device that is capable of communicating with the processor.

17. The apparatus as recited in claim 16, additionally including a driver circuit that is capable of sending at least one signal to the display, and wherein a controller is capable of sending at least a portion of the image data to the driver circuit.

18. The apparatus as recited in claim 16, further comprising:
    an image source module capable of sending the image data to the processor.

19. The apparatus as recited in claim 18, wherein the image source module includes at least one of a receiver, transceiver, and transmitter.

20. The apparatus as recited in claim 16, further comprising:
    an input device capable of receiving input data and to communicate the input data to the processor.

21. A method of positioning a movable conductive layer that is movable with respect to one or more fixed conductive layers in a display, the method comprising:
    applying a voltage to the one or more fixed conductive layers in the display;
    placing the movable conductive layer at an initial position, the initial position corresponding to a first position of the movable conductive layer;
    sensing a voltage on the movable conductive layer at the initial position;
    determining the initial position of the movable conductive layer with respect to at least one of the one or more fixed conductive layers based at least in part on the sensed voltage;
    determining a final position of the movable conductive layer with respect to at least one of the one or more fixed conductive layers, the final position corresponding to an immediately subsequent second position at which the movable conductive layer is to be placed after application of the charging voltage;
    determining the charging voltage based on the initial position and the final position; and
    applying the charging voltage to the movable conductive layer at the initial position.

22. The method as recited in claim 21, wherein the charging voltage is applied for a period of time that is less than a mechanical response time of the movable conductive layer.

23. The method as recited in claim 21, further comprising sensing the position of the movable conductive layer subsequent to applying the charging voltage, determining a corrective voltage based at least in part on the position sensed subsequent to applying the determined voltage, and applying the determined corrective voltage to the movable conductive layer.

24. An apparatus for driving a display including a movable conductive layer and one or more fixed conductive layers, the apparatus comprising:
    means for applying a voltage to the one or more fixed conductive layers in the display;
    means for placing the movable conductive layer at an initial position, the initial position corresponding to a first position of the movable conductive layer;
    means for sensing a voltage on the movable conductive layer at the initial position;
    means for determining the initial position of the movable conductive layer with respect to at least one of the one or more fixed conductive layers based at least in part on the sensed voltage;
    means for determining a final position of the movable conductive layer with respect to at least one of the one or more fixed conductive layers, the final position corresponding to an immediately subsequent second position at which the moveable conductive layer is to be placed after application of the charging voltage; and
    means for determining the charging voltage based on the initial position and the final position, the
    means for applying further configured to apply the charging voltage to the movable conductive layer at the initial position.

25. The apparatus as recited in claim 24, wherein the means for determining the initial position and the means for determining a final position comprise a voltage sensor, the means for determining a charging voltage comprises a controller, and the means for applying the charging voltage comprises a controller.

26. The apparatus as recited in claim 24, further comprising means for isolating the movable conductive layer from the charging voltage prior to the movable conductive layer responding to the applied voltage.

27. The apparatus as recited in claim 26, wherein the means for isolating the movable conductive layer comprises a switch.

28. A computer program product for positioning a movable conductive layer that is movable with respect to one or more fixed conductive layers in a display, the computer program product comprising:
    a non-transitory computer-readable medium having stored thereon code for causing processing circuitry to:
        apply a voltage to the one or more fixed conductive layers in the display;
        place the movable conductive layer at an initial position, the initial position corresponding to a first position of the movable conductive layer;
        sense a voltage on the movable conductive layer at the initial position;
        determine the initial position of the movable conductive layer with respect to at least one of the one or more fixed conductive layers based at least in part on the sensed voltage;
        determine a target final position of the movable conductive layer with respect to at least one of the one or more fixed conductive layers, the target final position corresponding to an immediately subsequent second position at which the movable conductive layer is to be placed after application of the charging voltage;
        determine the charging voltage based on the initial position and the target final position; and
        apply the charging voltage to the movable conductive layer at the initial position.

29. The computer program product as recited in claim 28, wherein the charging voltage is applied for a period of time that is less than a mechanical response time of the movable conductive layer.

* * * * *